United States Patent [19]

Widney

[11] Patent Number: 4,996,608
[45] Date of Patent: Feb. 26, 1991

[54] DISK DRIVE CLOCK WRITER

[75] Inventor: Douglas F. Widney, Camarillo, Calif.

[73] Assignee: Data Exchange Corporation, Camarillo, Calif.

[21] Appl. No.: 265,788

[22] Filed: Nov. 1, 1988

[51] Int. Cl.5 ............................................. G11B 5/09
[52] U.S. Cl. ..................................................... 360/51
[58] Field of Search .................................. 360/39, 51

[56] References Cited

U.S. PATENT DOCUMENTS

| | | | |
|---|---|---|---|
| 2,926,341 | 2/1960 | Scarbrough | 340/174 |
| 3,531,787 | 9/1970 | Fuller | 340/74.1 |
| 3,668,665 | 6/1972 | Reynolds | 360/51 |
| 3,893,172 | 7/1975 | Celek | 360/51 |
| 4,414,589 | 11/1983 | Oliver | 360/78 |

Primary Examiner—Vincent P. Canney
Attorney, Agent, or Firm—Spensley Horn Jubas & Lubitz

[57] ABSTRACT

A clock pattern writer for a disk drive, having circuitry to write a preliminary clock pattern having a number of clock pulses approximately equal to a desired predetermined number of clock pulses. A second clock pattern having the predetermined number of clock pulses is written by correcting the preliminary pattern as appropriate to achieve the desired number of clock pulses. In the illustrated embodiment, a phase lock loop generates a source signal in phase with the preliminary clock pattern and correction circuitry repeatedly advances or retards the phase of selected individual pulses of the source signal so that the second clock pattern has the predetermined number of clock pulses. Preferably, phase transients in the clock pattern may be eliminated or reduced by writing a third clock pattern using a phase lock loop locked to the second clock pattern.

10 Claims, 20 Drawing Sheets

DIRECT CLOSURE (TYPICAL)

INTERMEDIATE FREQUENCY CLOSURE (TYPICAL)

CORRECTED CLOSURE

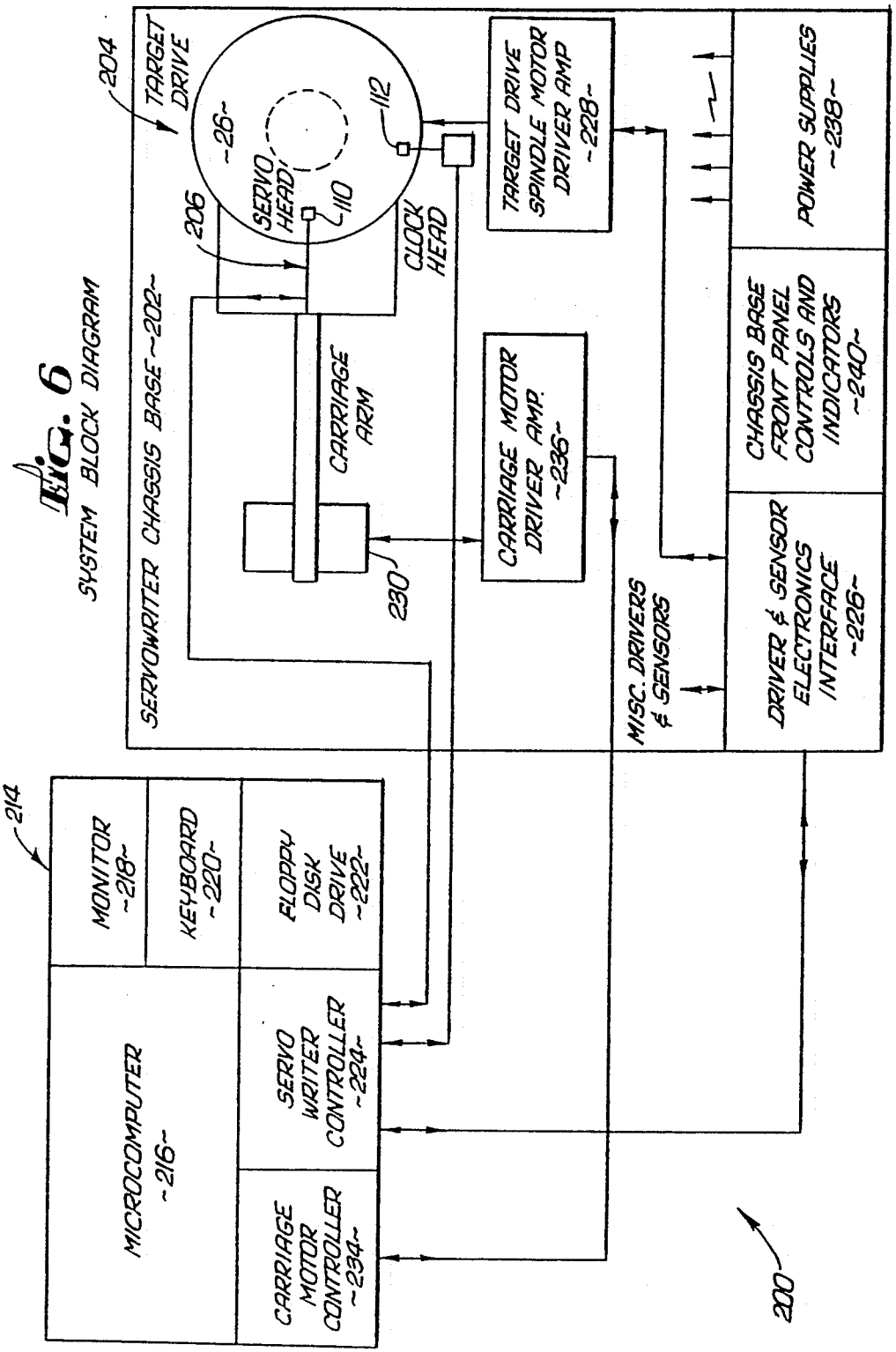
Fig. 6 SYSTEM BLOCK DIAGRAM

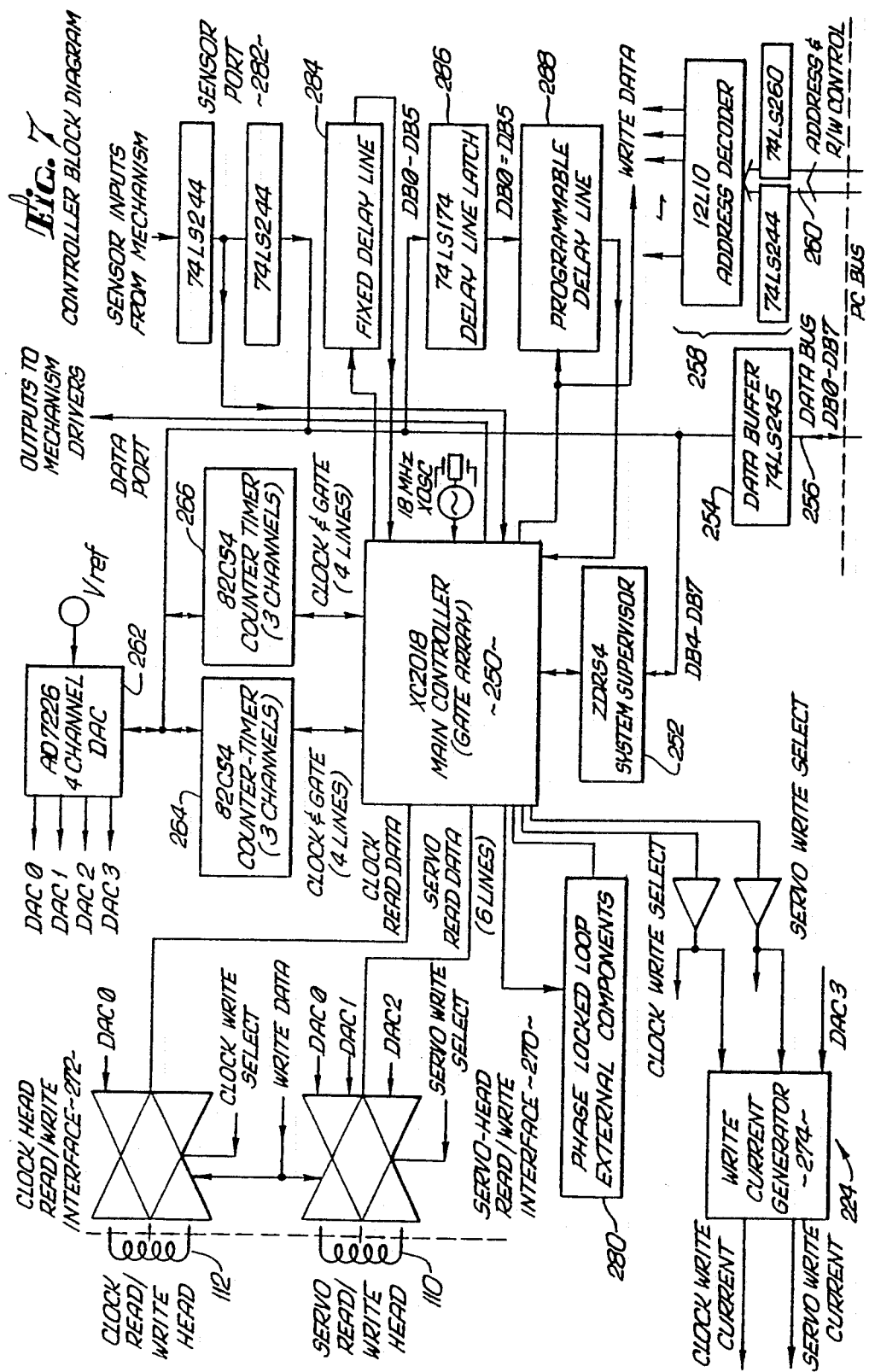

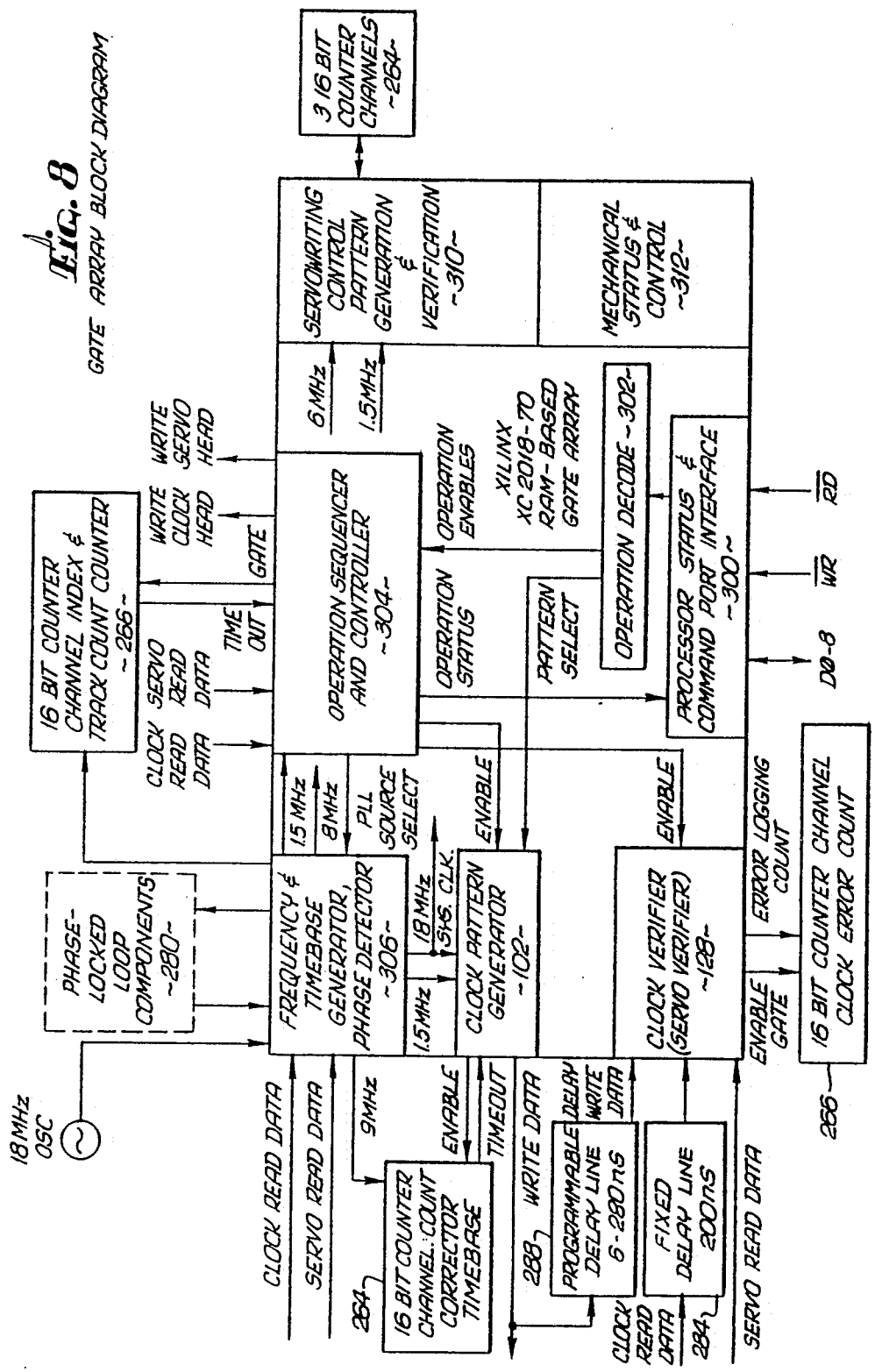

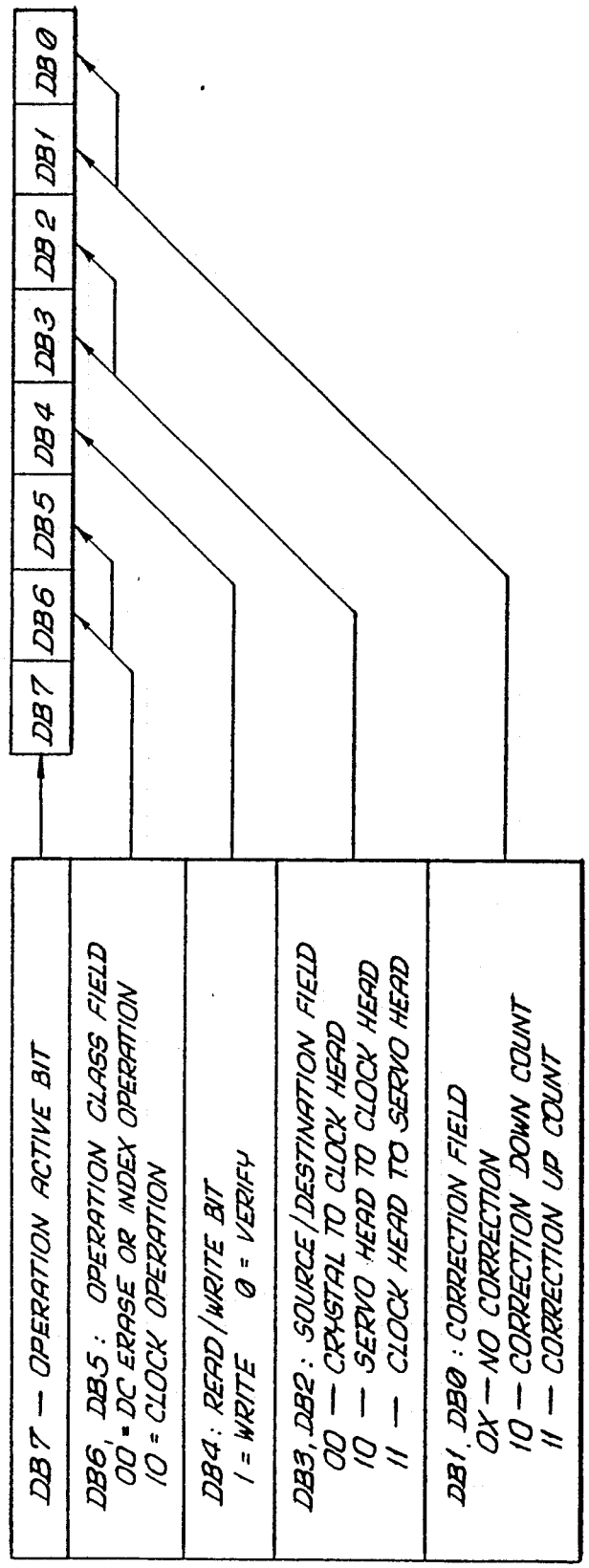

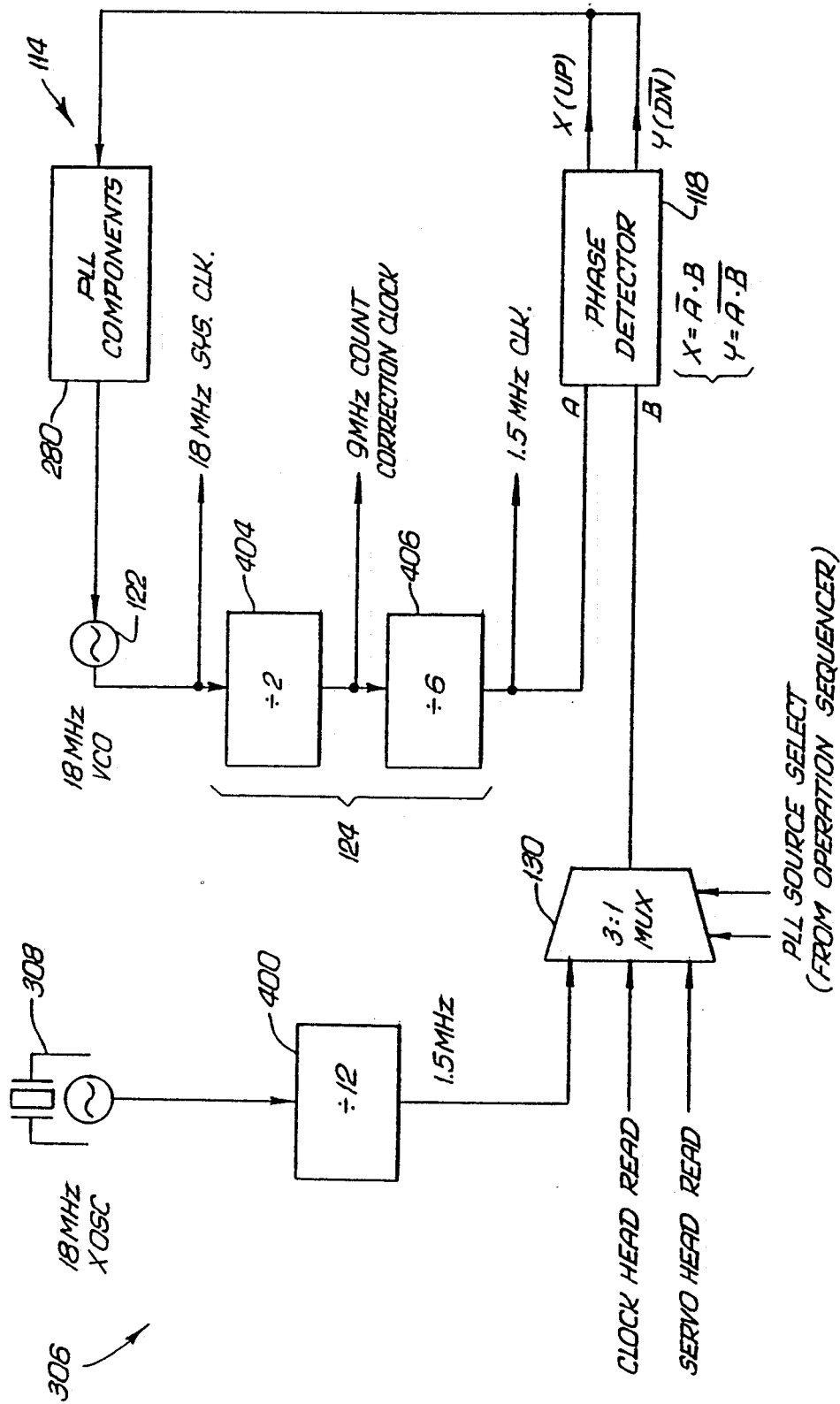

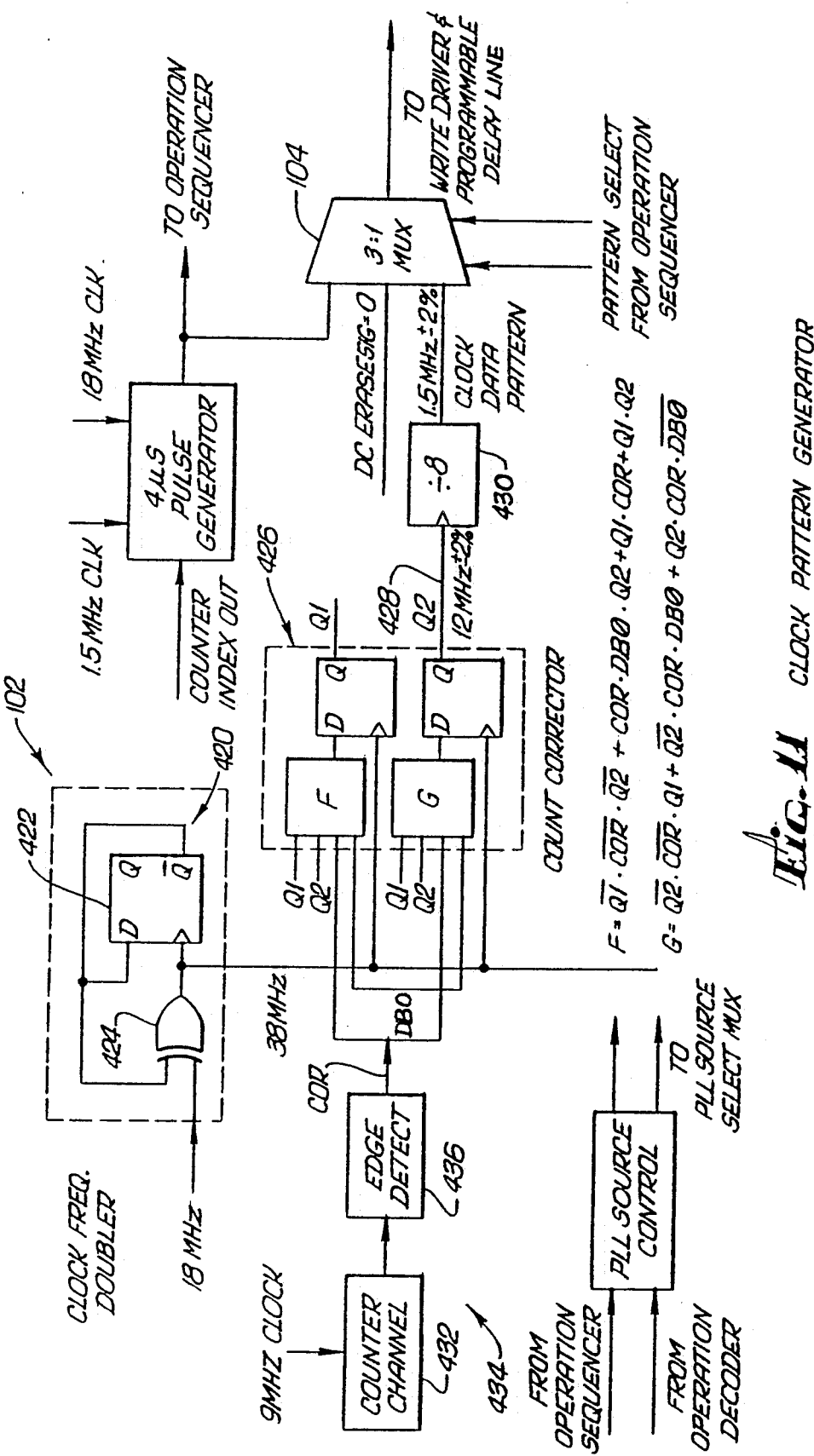
Fig. 11 CLOCK PATTERN GENERATOR

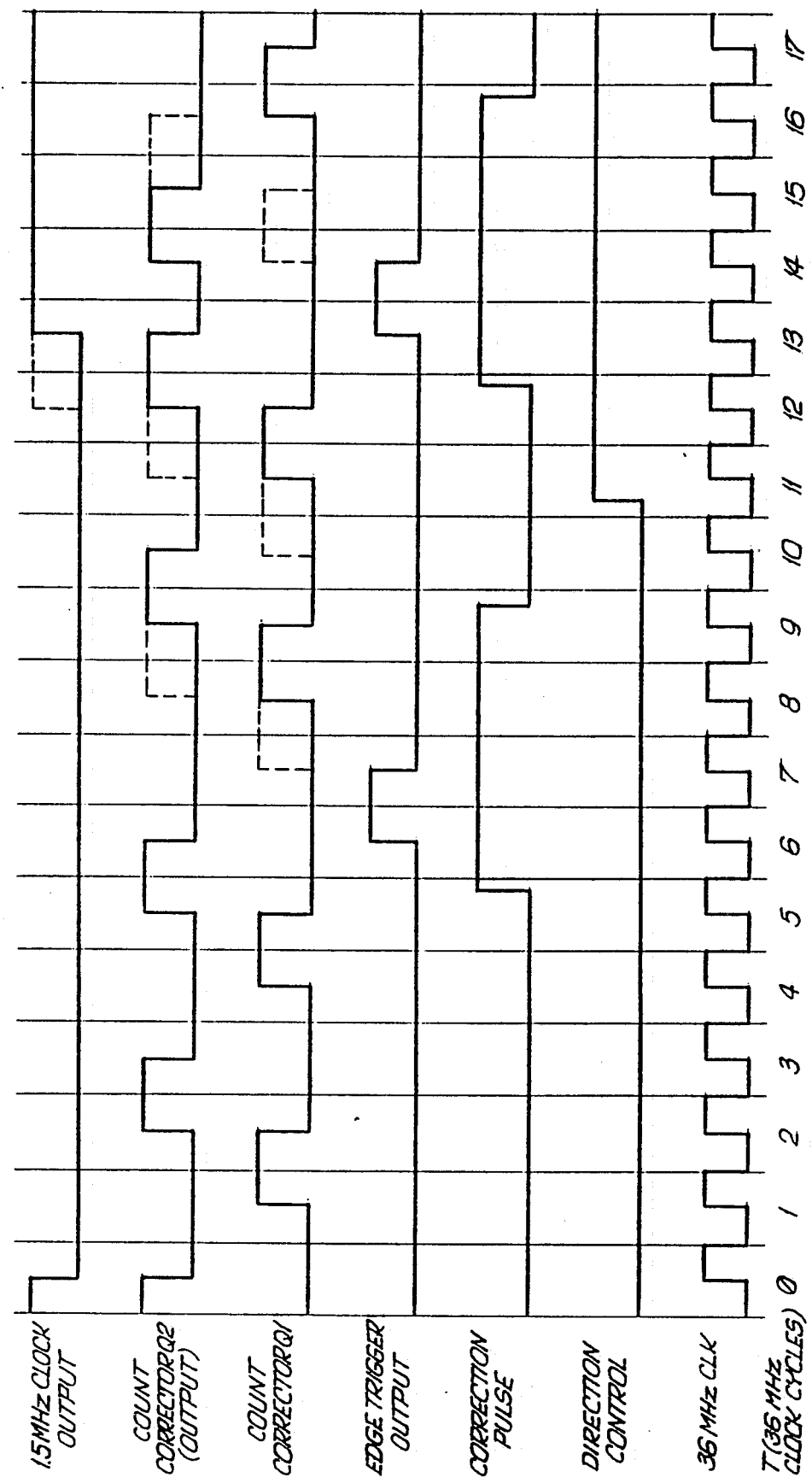

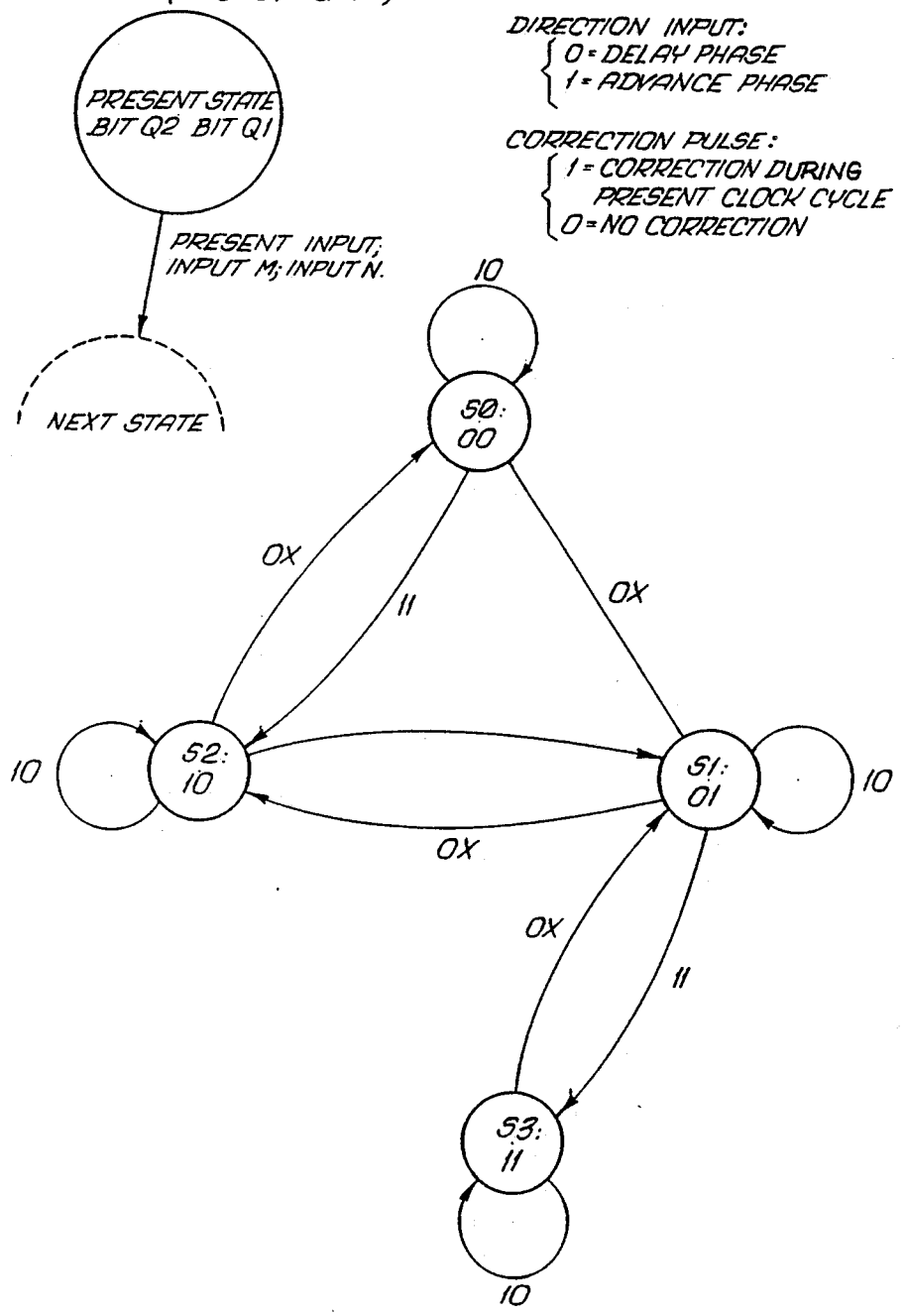

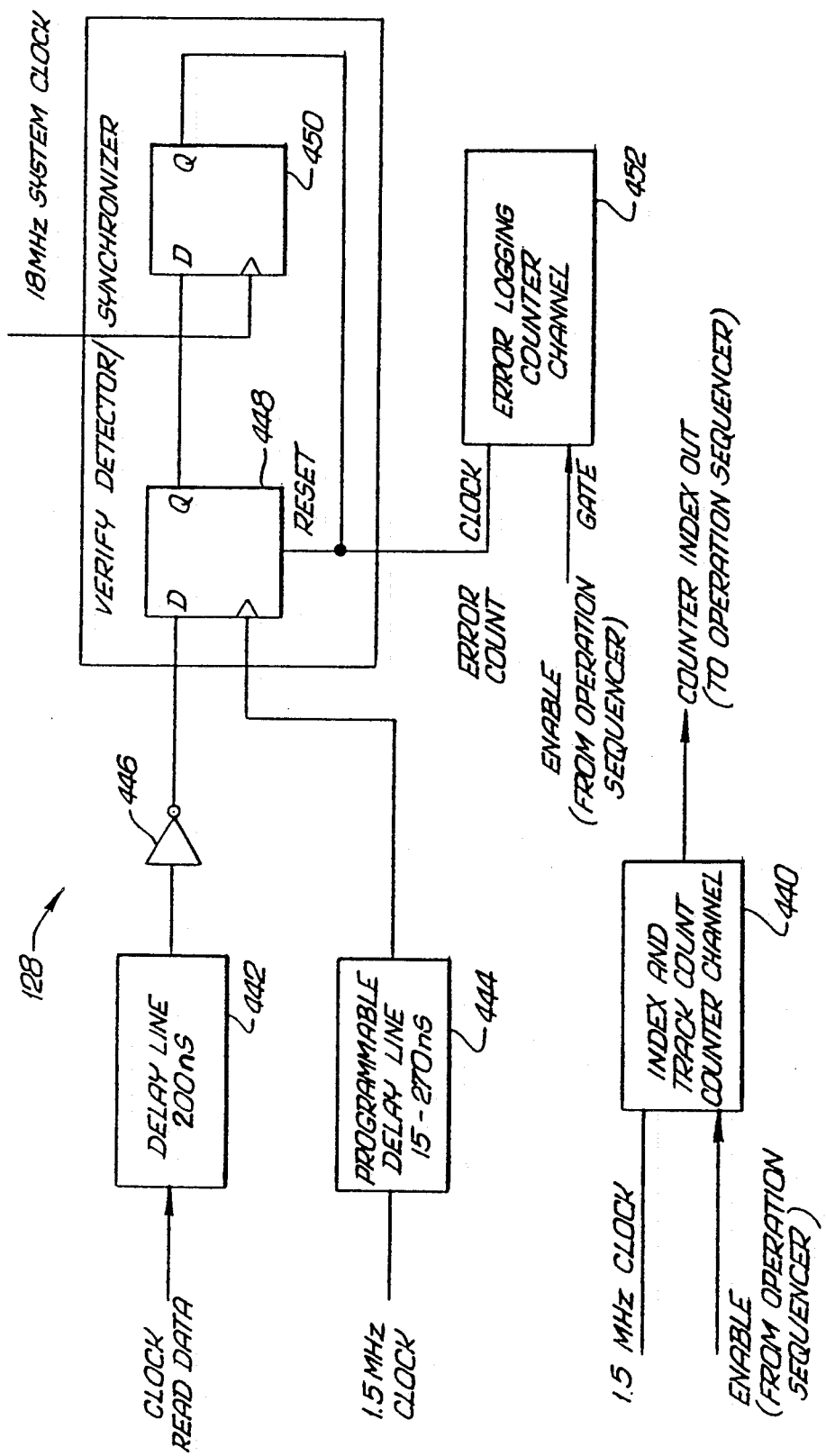
FIG. 14 CLOCK DATA VERIFIER

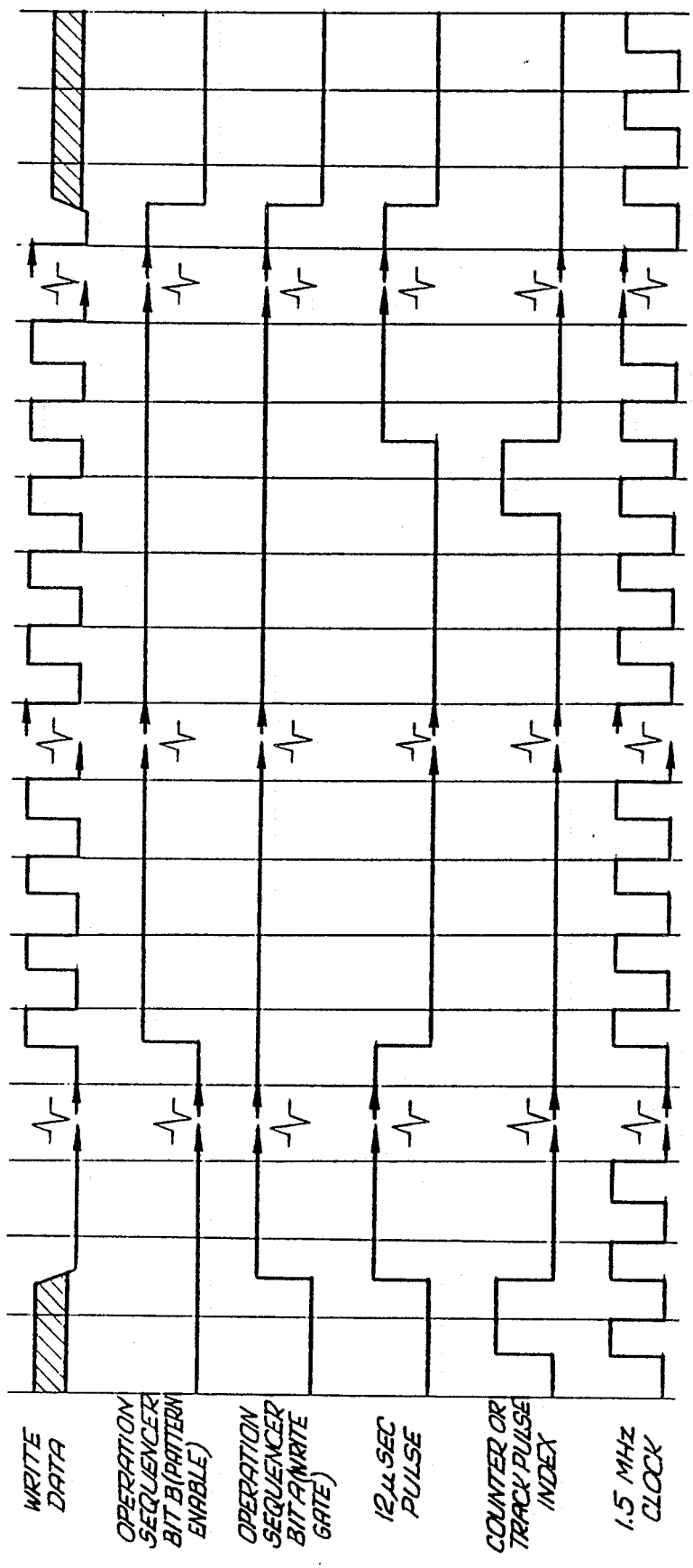

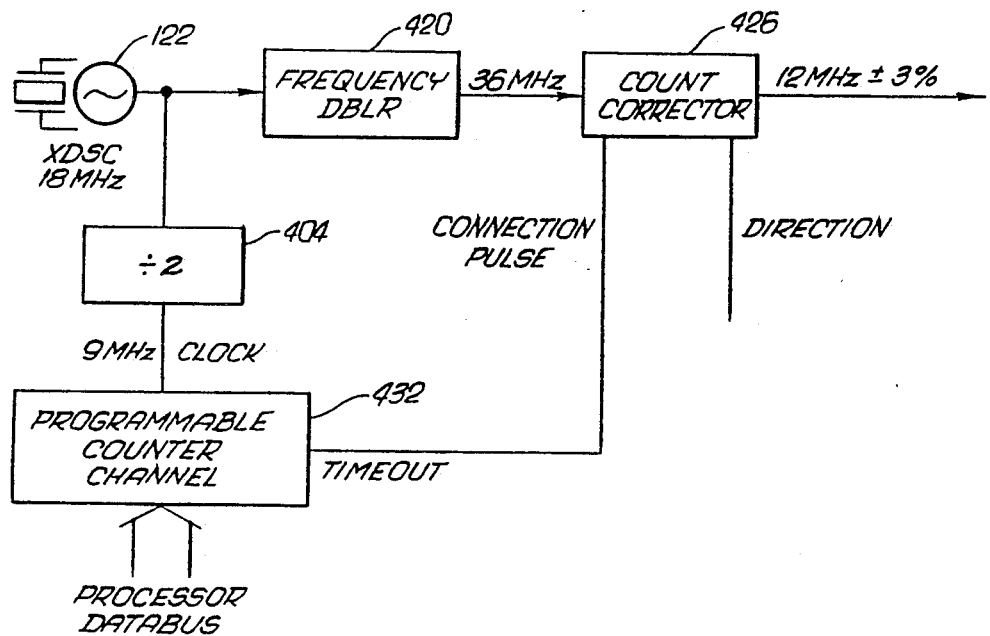
Fig. 16A SIMPLE COUNT CORRECTOR SYSTEM
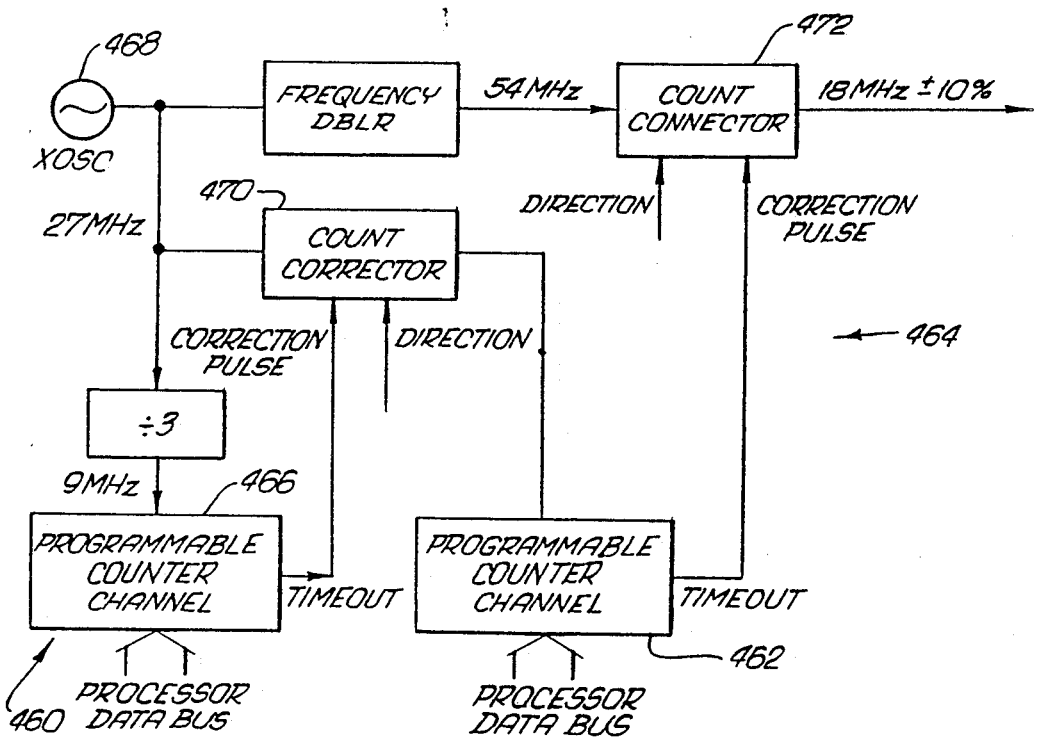
Fig. 16B COMPOUND COUNT CORRECTOR SYSTEM

CLOCK CLOSURE

CLOCK CLOSURE FLOWCHART VERIFY

DISK DRIVE CLOCK WRITER

BACKGROUND OF THE INVENTION

1. Field of the invention

The present invention relates to clock pattern writers for magnetic disk drive memories.

2. Description of Related Art

Magnetic disk drive memories are well-known devices for storing large quantities of digital data. An example of a typical disk drive is indicated generally at 10 in FIG. 1. As the name suggests, a disk drive has one or more disks 12 coated with a magnetizable medium such as ferrous oxide on which the data may be magnetically stored. The disks, often referred to as platters, may be vertically stacked and caused to rotate about a central spindle 14. Data may be stored or "written" onto each surface of the media platters by read-write data heads 16 which are placed in close physical proximity to the surface of a platter. By passing a current through a read-write head, a small portion of the surface of the associated platter may be magnetized to form a magnetic domain and store a digital 1 or 0 onto the platter.

Typically, the read-write heads 16 are rigidly coupled to each other in a vertical stack, and may be moved together as an assembly 20 in a radial motion by a positioning mechanism 22 either towards or away from the spindle 14 of the platter stack. At each position of a head of the head stack, a unique circular track is defined in the surface of the associated platter as the platter rotates below the head. To read data written on the circular data tracks, currents induced in the read-write data heads by the magnetic domains on the media platter are sensed and amplified for transmission to other parts the computer system.

Many disk drive designs require a special "clock pattern" be written around a track of one or more surfaces of the platters. The track on which the clock pattern is written is referred to as the clock track. The clock pattern as it is read from the clock track provides timing information for a variety of purposes. For example, the clock pattern may be used to generate special timing signals for synchronizing the data read operation. These timing signals include "write clock" and "sector mark" signals. In addition, the clock pattern may be used to generate "servo tracks" which are used to position the read-write heads of the disk drive over the data tracks. Timing information may be encoded into the servo tracks so that the write clock and sector mark signals may be generated from the servo tracks as well. Consequently, in some disk drive designs, the clock track is discarded after the servo tracks are written.

For proper operation, it is very important that the clock pattern have exactly a predetermined number of pulses around the clock track. This requirement is referred to as "count closure" and the predetermined number of pulses is referred to as the "clock track pulse count." As the density of data stored on disk drives has increased, the magnitude of the clock track pulse count has correspondingly increased. For some disk drive designs, the clock track pulse count exceeds 100,000, which makes it more difficult to exactly match the required clock track pulse count when writing the clock pattern onto the clock track.

In addition, the presence of phase transients, that is, the presence of uneven spacing between the pulses of the clock track must be reduced as much as possible. Furthermore, phase transients at the point of the clock track where the end of the clock pattern being written is joined to the beginning of the clock pattern must be particularly avoided. This requirement is referred to a "phase closure." Many disk drive designs allow a maximum of 10 to 30 nanoseconds phase transient in the clock pattern.

Previously, many disk drives used marks which were physically inscribed on the surface of the platter to generate the necessary clock signals. Other designs utilized optical or electromagnetic transducers affixed to the spindle of the drive. U.S. Pat. No. 4,155,105 to Braun describes a transducer-based clock system. However, these electro-mechanical designs are not well suited to high data density disk drives which generally require very high frequency clock signals. Similarly, these prior designs do not readily allow the writing of temporary clock patterns and are not easily adapted to smaller disk drives having platters eight inches or smaller.

To overcome these difficulties, various electronic clock generating systems have been developed. One prior system uses a technique referred to as the "speed head method" which measures the rotational speed of the platters. Referring now to FIG. 2, a master speed head 30 and a slave speed head 32 are positioned over the same data track at a closely controlled angular spacing. An index pulse (or series of pulses) generated by a generator 38 is written by the master speed head 30. The time difference between the detection of the pulse at the two heads 30 and 32 is then measured. In this manner, a precise measurement of the rotational speed of the platter is obtained. This information is supplied to a phase-locked loop 34 which is used to generate a clock signal pattern which is written on the disk by a third head, the clock head 36. Alternatively, the speed head signal may be supplied as a feedback signal to the spindle motor speed regulator of the disk drive.

After the clock track has been written, verifier circuitry 40 checks the clock track for proper count and phase closure. If the count and phase closures are not within the specified ranges, the clock track must be erased and rewritten until a correct clock track has been achieved. A second phase-locked loop 42 may then be locked onto the clock signal from the clock track to write the servo patterns or sector marks. U.S. Pat. No. 4,371,902 to Baxter et al. describes speed head techniques.

Referring now to FIG. 3, a direct closure process usually begins with the writing of a single index pulse using an index head 44. The output of a voltage-controlled oscillator 46 is divided in frequency by a count n equal to the track pulse count, and the resultant output signal of the n divider is locked onto the index signal from the index head 44 by a phase-locked loop 48.

The output of the oscillator 46 is provided to a temporary clock head 50 to write a temporary clock track. Verifier circuitry 52 checks for count closure. If the temporary clock track does not have the correct track pulse count, it must be rewritten over and over using the above process until the correct count is achieved.

Once the temporary clock track has been successfully written, the output signal of another phase-locked loop 54 is locked onto the temporary clock pattern signal to generate the final clock track which is written by the clock head 56. The filter bandpass of the second phase-locked loop 54 is normally higher than that of the first loop 48 to enable to the second loop 54 to better track any disk speed variations. However, the bandpass is also calculated so as to suppress any phase transients which may have occurred at the write splice on the temporary clock track.

It is noted that in theory, the final clock track might be written directly from the first phase locked loop 48, without the use of an intermediate clock track. However, an extremely great number of attempts may be required to achieve both count and phase closure. Moreover, an additional phase-locked loop will usually be required for user applications of the final clock track. A direct closure clock writing system is described in U.S. Pat. No. 3,540,022.

Intermediate frequency clock closure systems (FIG. 4.) are similar to direct closure systems, except that the temporary clock track is typically written at a frequency much lower than the final clock frequency—usually an integral submultiple of the final clock frequency. Thus, a divide by k circuit of the low frequency phase-locked loop 60 divides by a count k<n of the divide by n circuit of FIG. 3. As a consequence, count closure is much more readily achieved in the temporary clock track.

In addition, a frequency divider circuit 62 is also employed in the intermediate frequency phase-locked loop 64 which controls the writing of the final clock track. The second frequency divider circuit 62 allows the desired clock track pulse count to be achieved. A third phase-locked loop 66 is typically provided for user applications of the final clock track. It is noted that more than one intermediate frequency stage may be employed. U.S. Pat. No. 4,131,920 describes a type of intermediate frequency closure systems in which an intermediate frequency clock track is written having a track count which is not integrally related to the final clock track count.

It should be noted that there are a number of variations of the above systems. For example, the verify operation may be performed during the writing operation rather than in a subsequent read operation. Also, direct closure and intermediate frequency closure systems may be implemented without a dedicated index head. For example, a temporary index may be written on the track opposite from the temporary or final clock track, used for verify and phase-locking operations, and then discarded.

These previous electronic closure systems have a number of disadvantages. The update rate of the phase-locked loop for the first clock write operation is usually equal to the rotation period of the drive (or to a small integral multiple of it, in the case of certain speed head method variants). The time constant of the phase-locked loop is often much longer than the update rate, and therefore may be many orders of magnitude larger than the period of the final clock track signal. As a result, the phase-locked loop may require many revolutions of the disk to achieve lock. Moreover, once lock has been achieved, it may be unable to follow closely any instantaneous speed variations of the disk or frequency drift of the voltage-controlled oscillator. Consequently, many attempts may be required before achieving closure—particularly when using direct closure to write a high-density clock track on a disk drive with a relatively poor spindle speed regulation.

The speed head closure method suffers from a stringent requirement for accuracy in the relative angular and radial placement of the speed heads. Also, the speed head method usually requires three heads instead two.

The direct closure and intermediate frequency closure systems usually require a multiplicity of phase-locked loops, each often having a unique passband characteristic, for best performance. Direct closure systems normally require two phase-locked loops; intermediate frequency systems may require three or even four phase-locked loops. In general phase-locked loops use significant numbers of discrete analog components which are not readily compatible with large scale integrated circuits. Moreover, the intermediate frequency method is not readily suited for applications requiring a programmable track pulse count and frequency.

SUMMARY OF THE INVENTION

It is an object of the present invention to provide an improved clock pattern writer, obviating for practical purposes, the above mentioned limitations, particularly in manner requiring a relatively uncomplicated electronic arrangement.

These and other objects and advantages are achieved in a clock pattern writer for writing a clock pattern having a predetermined number of clock pulses, in which circuitry is provided to first write a preliminary clock pattern having a number of clock pulses approximately equal to the predetermined number of clock pulses. A second clock pattern having the predetermined number of clock pulses is then written by correcting the preliminary clock pattern as appropriate to achieve the desired number of clock pulses. In the illustrated embodiment, a phase-locked loop is used to generate a source signal in phase with the preliminary clock pattern and correction circuitry repeatedly advances or retards the phase of individual pulses of the source signal by a small fraction of the clock period so that the second clock pattern has the predetermined number of clock pulses. Phase transients in the second clock pattern may be eliminated or substantially reduced by writing a third clock pattern using a phase-locked loop locked to the second clock pattern. In this manner, the correct track pulse count of the second clock pattern is retained while all phase transients may be reduced to negligible levels by action of the phase-locked loop.

As will be made more clear in connection with the following detailed description, such an arrangement allows count closure and phase closure to be quickly achieved. The system enables economical large scale integration gate implementation while minimizing discrete phase locked components. The same phase-locked loop may be used in each stage of the clock writing process.

BRIEF DESCRIPTION OF THE DRAWINGS

FIG. 6 is a system block diagram of the clock pattern writer of FIG. 5;

FIG. 7 is a schematic diagram of a controller circuit for the clock pattern writer of FIG. 6;

FIG. 8 is a schematic diagram of a gate array circuit for the controller of FIG. 7;

FIG. 9 depicts the command word format for the gate array of FIG. 8;

FIG. 10 is a schematic diagram of the frequency and time base generator logic of the gate array of FIG. 8;

FIG. 11 is a schematic diagram of the clock pattern generator logic of the gate array of FIG. 8;

FIG. 12 illustrates various waveforms of the clock pattern generator logic of FIG. 11;

FIG. 13 is a state diagram for the count corrector circuit of the clock pattern generator circuit of FIG. 11;

FIG. 14 is a schematic diagram of the clock data verifier logic circuitry of the gate array of FIG. 8;

FIG. 15 depicts various timing waveforms illustrating the operation of the operation sequencer logic of the gate array of FIG. 8;

FIGS 16A and 16B illustrate alternative count corrector logic circuitry;

FIGS. 20–22 are flow charts illustrating the clock closure, verify and phase closure verify operations of the clock pattern writer of FIG. 7.

DETAILED DESCRIPTION OF THE DRAWINGS

Figure 1:
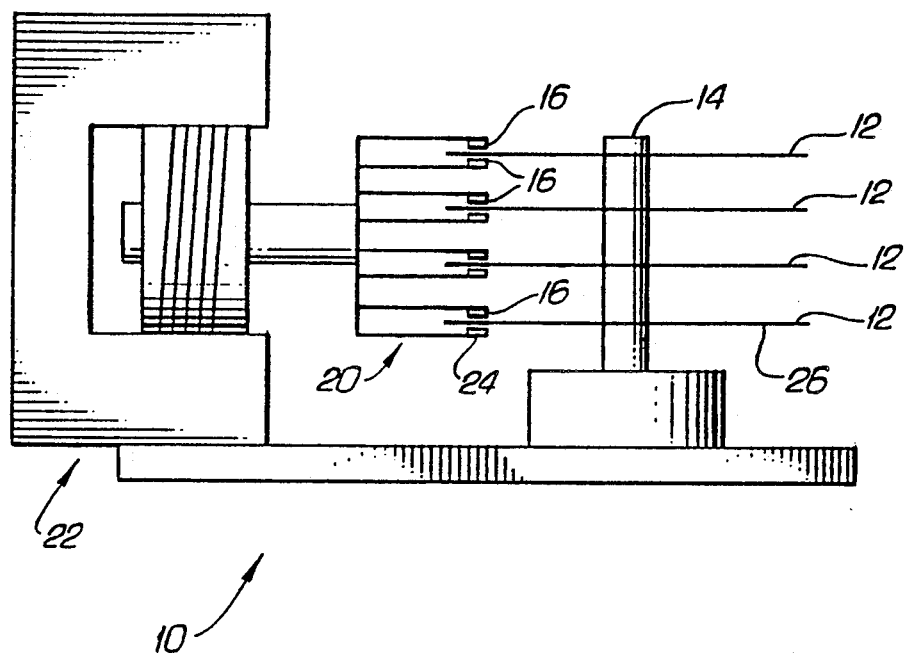
FIG. 1 is a schematic diagram of a disk drive.
Figure 2:
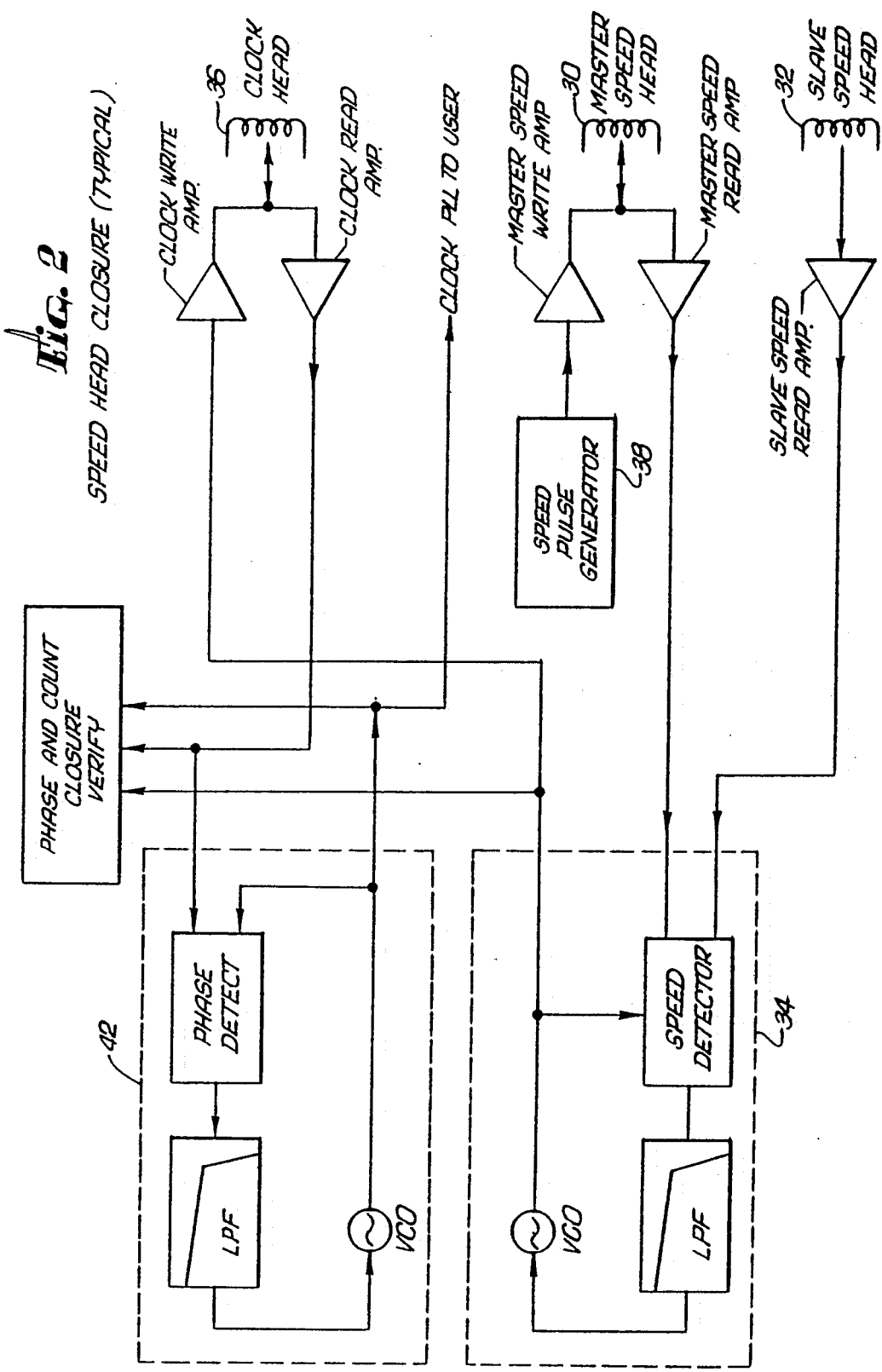
FIG. 2 is a schematic diagram of a previous speed-head clock closure circuit.
Figure 3:
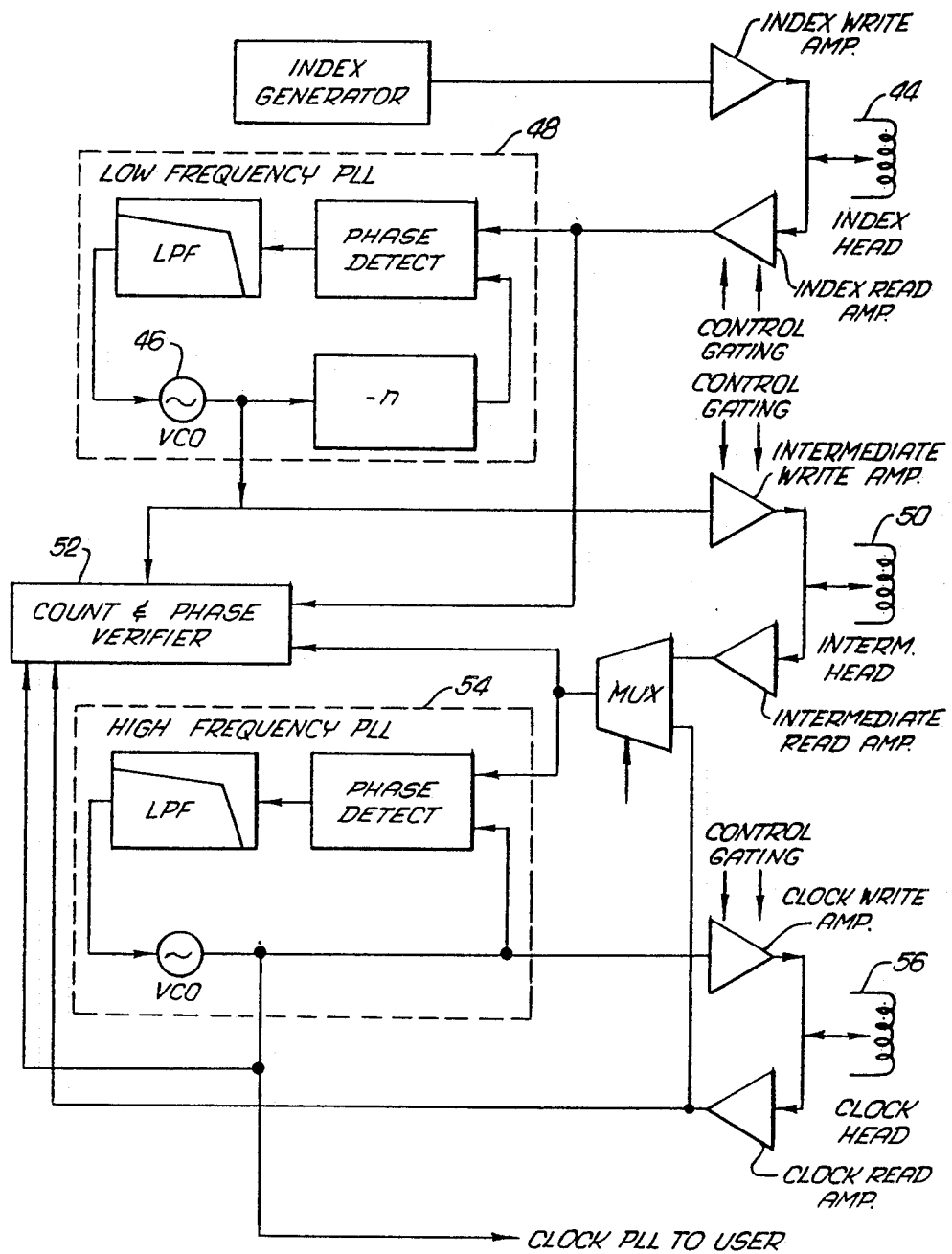
FIG. 3 is a schematic diagram of a previous direct closure circuit.
Figure 4:
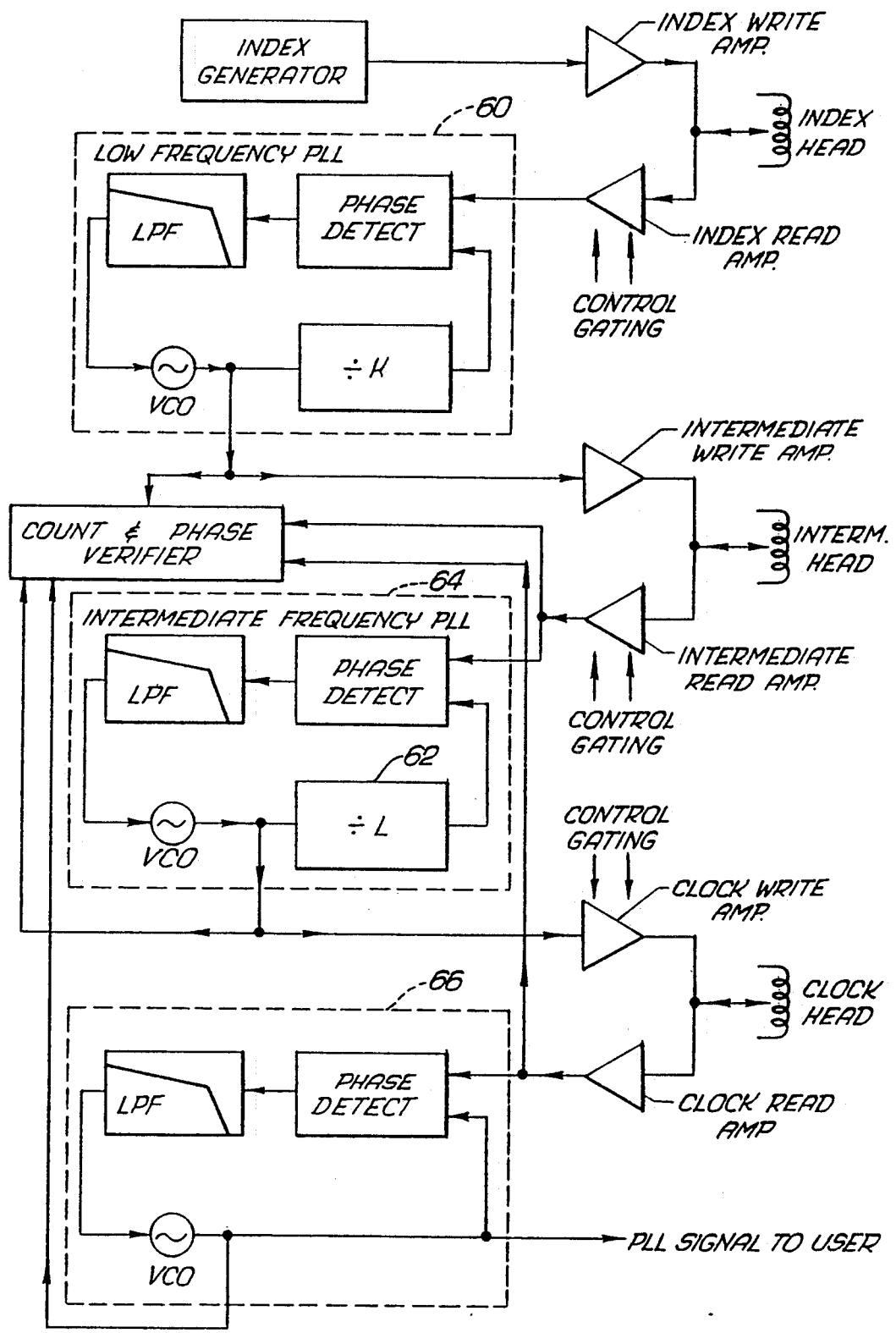
FIG. 4 is a schematic diagram of a previous intermediate frequency closure circuit.
Figure 5:
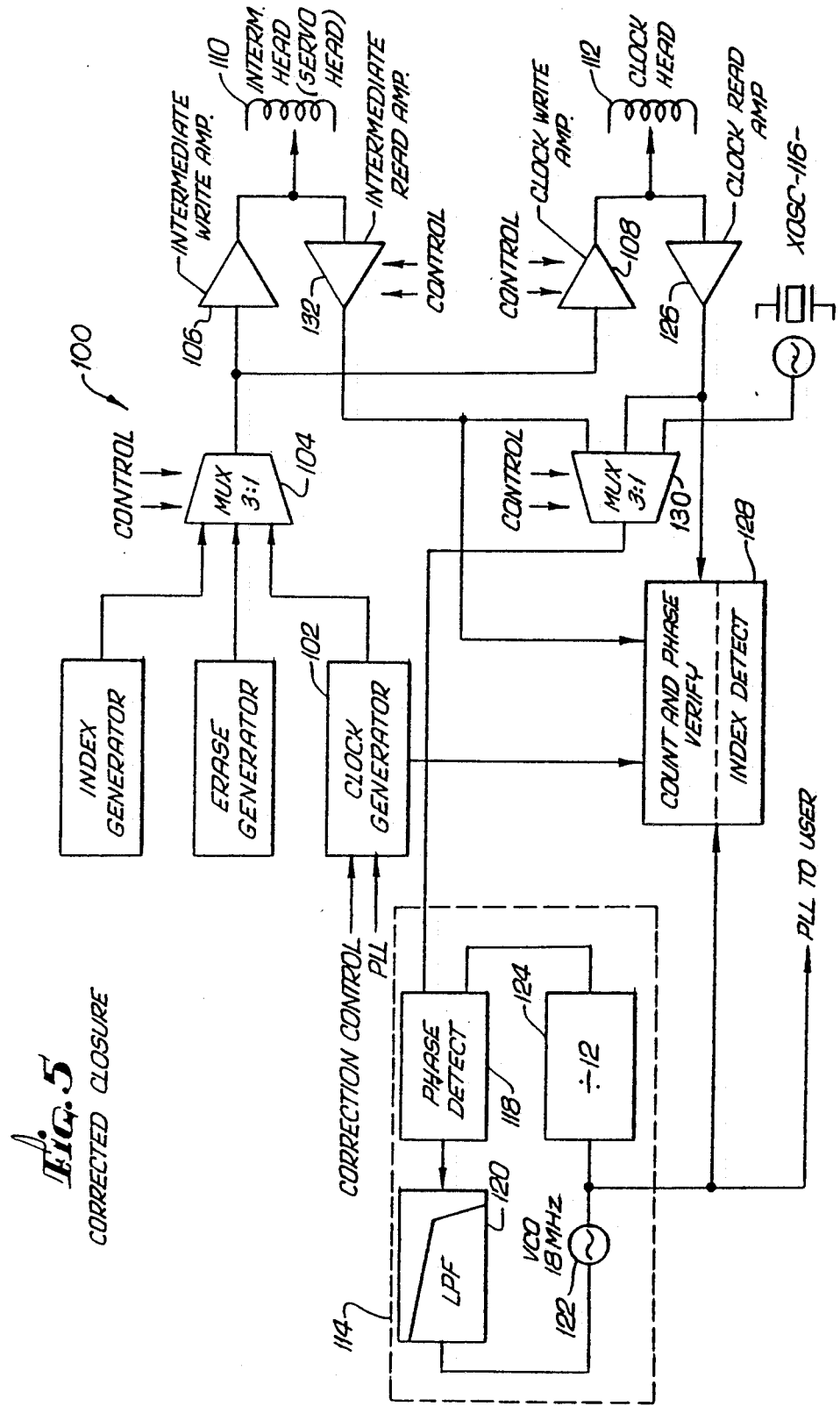
FIG. 5 is a schematic diagram of a clock pattern writer circuit in accordance with a preferred embodiment of the present invention.

A clock pattern writer circuit, in accordance with a preferred embodiment of the present invention is indicated generally at 100 in FIG. 5. The clock pattern writer circuit (hereinafter "clock writer") 100 includes a clock generator circuit 102, the output of which is coupled by a multiplexer 104 to the write amplifiers 106 and 108 of an intermediate read-write head 110 and a clock head 112, respectively. The clock generator 102 receives as an input the output PLL of a phase-locked loop 114, and generates the clock pattern which is written on the servo surface 26 of the disk drive 22 (FIG. 1).

In one aspect of the present invention, the clock generator circuit 102 is first used to write a preliminary clock pattern on the disk wherein the preliminary clock pattern has a number of clock pulses approximately equal to the final desired number of clock pulses. In a second stage, the preliminary clock pattern is then read back through a clock read amplifier 126 to a verifier circuit 128 which determines the actual number of pulses in the preliminary clock pattern. In the illustrated embodiment, the preliminary clock pattern is written using the output of a crystal oscillator 116 to the input of the phase-locked loop 114 which includes a phase detector 118, a low pass filter 120, a voltage controlled oscillator 122 and a divide by 12 circuit 124.

Once the actual pulse count of the preliminary clock pattern has been determined by the verifier circuit 128, a multiplexer circuit 130 switches the input of the phase-locked loop 114 to the output of the clock read amplifier 126 so that the phase-locked loop is locked onto the preliminary clock pattern from the clock head 112 instead of the output of the crystal oscillator 116. In addition, the actual pulse count of the preliminary clock pattern as determined by the verifier circuit 128 is used to generate correction pulses which are applied to the clock generator circuit 102 to periodically advance or retard the phase of the clock signal being written to a second temporary clock track by the intermediate write amplifier 106 and intermediate read-write head 110. The correction pulses are applied more or less frequently, depending on the number of counts by which the preliminary clock pattern is in error, so that the second preliminary clock track will have exactly the correct track pulse count, eliminating the need for retries.

However, the second temporary clock pattern will contain a series of small phase transients. Consequently, in a third stage of the clock closure process, the input to the phase-locked loop 114 may be switched via the multiplexer 130 to the output of the intermediate read amplifier 132 so that the phase-locked loop locks onto the second preliminary clock pattern. The output PLL of the phase-locked loop 114 is used by the clock generator 102 with no correction pulses to write a final clock track via the clock head 112. In this final clock track, the correct track pulse count of the second preliminary clock pattern is retained, but all the phase transients will be reduced to negligible levels by the action of the phase-locked loop 114. Thus, it is seen that the single phase-locked loop 114 is employed at each stage of the closure process with the update rate being equal to the clock frequency. Furthermore, only two heads are needed.

In the illustrated embodiment, the clock pattern writer 100 is part of a servo pattern writer system indicated generally at 200 in FIG. 6. The servo pattern writer system (hereinafter "servowriter") 200 is described in greater detail in copending application entitled "Configurable Disk Memory Servowriter", Ser. No. 07/265,837, filed Nov. 1, 1988, assigned to the assignee of the present application and incorporated herein by reference. The servowriter 200 includes a chassis base 202 on which a disk drive 204 may be securely mounted by appropriate removable clamps (not shown). The clamps and chassis base 202 are preferably readily adaptable to receive a variety of different disk drives. Also mounted on the chassis base 202 is a carriage arm 206 which radially moves a servo head 110 over the servo surface 26 of the disk drive 204. The servo head 110 is used as the intermediate head of the clock closure process of the illustrated embodiment. A clock head 112 is mounted at a fixed radius over the servo surface 26. An actuator (not shown) may be provided to lower the head 112 over the media surface once the disk drive 204 is secured on the chassis base 202 to initiate the clock and servo writing process, and to raise the clock head once the process is complete.

The pattern writing process is controlled by a controller station 214 which, in the illustrated enbodiment, includes a microcomputer 216 which may be, for example, an IBM compatible personal computer. The microcomputer 216 has an associated monitor 218, keyboard 220, and floppy disk drive 222. The clock and servo pattern to be written onto the disk drive 204 is generated by a writer controller 224 which also controls the spindle motor of the disk drive 204.

In the illustrated embodiment, the writer controller 224 comprises gate array logic which may be programmed by the microcomputer 216 to be interconnected in a particular configuration to generate the desired clock and servo patterns. The programmable gate array logic and associated peripheral circuits may be mounted on a single printed circuit board which may be received by an expansion slot in the microcomputer 216. As a consequence, the controller station 214 need be no larger than a standard personal computer.

The writer controller 224 is coupled to the servowriter chassis base 202 and disk drive 204 by a driver and sensor electronics interface 226 which includes drivers and sensors for the clock head actuator and sensors for the spindle and carriage arm 206. In addition, the spindle motor of the disk drive 204 is driven through a driver amplifier 228 coupled to the interface 226.

In the illustrated embodiment, the servo head 110 attached to the carriage arm 206 is positioned by an actuator 230 which includes a precision lead screw having a pitch of 40 turns per inch. The lead screw is driven by a D.C. permanent magnet motor which is controlled by a type DMC-400 motor control system manufactured by Galil Enterprises. The DMC-400 system includes a carriage motor controller board 234 which, like the controller board 224, readily plugs into an expansion slot in the microcomputer 216. The output of the controller 234 drives the carriage motor of the actuator 230 through a carriage motor amplifier 236.

The DMC-400 controller 234 includes a high-speed microprocessor to simulate the action of linear servo system components. Hence, the gain, band width, movement profile and other servo parameters are programmable and may be optimized for various mechanism attachments. The method of programming the DMC-400 is well-known to those skilled in the art and is described in the User's Manual supplied by the manufacturer. An example of a suitable program for the DMC-400 is set forth in Appendix A of copending application "Configurable Disk Memory Servowriter".

In the illustrated embodiment, a 4,000 count per turn optical encoder supplies position feedback signals to the carriage motor controller 234. As a consequence, the position of the servo head 110 may be controlled to a resolution of 6 micro-inches. Other modules, such as a laser interferometer, may be substituted as appropriate for the optical encoder, simply by reprogramming the carriage controller 234.

The servowriter chassis base 202 includes the power supplies 238 for the motors and electronic circuitry mounted on the chassis base 202. A front panel 240 has power switches for the power supplies 238 and "ready" status indicators.

The writer controller board 224 is shown in greater detail in FIG. 7. The central control element of the writer controller board 224 is a RAM-based, programmable gate array 250 which has a plurality of internal logic elements. The gate array 250 of the illustrated embodiment is implemented with a type XC 2018 Logic Cell TM array integrated circuit, manufactured by Xylinx, Inc. The type and interconnection of the logic elements of the gate array 250 may be configured by a program stored in an onboard read-write memory. This program which defines the logic design appropriate to the particular disk drive being clock and servo written is first created and stored as a disk file in the microcomputer floppy disk drive 222 (FIG. 6). The disk file containing the logic gate interconnection program is transferred ("down loaded") to the gate array 250 prior to initiation of the servo writing operation. Once loaded, the gate array 250 becomes a writer controller integrated circuit specialized for the particular disk drive clock and servo types to be written. The gate array 250 will then accept a series of operation commands written to it by the microcomputer 214 to perform the clock and servo writing operations, and can also return status information when read.

To assist in loading the logic design program, the controller board 224 further includes a system supervisor 252 (type 16RS4 PAL integrated circuit, manufactured by Monolithic Memories, Inc.) which accepts commands for program loading, read back, reset and fault monitoring and also returns status information when read. The system supervisor 252 is coupled by a data buffer 254 to the microcomputer data bus 256. The gate array 250, system supervisor 252 and other integrated circuit devices of the writer controller board 224 may be accessed by the microcomputer 216 (FIG. 6) at input-output port addresses supplied by the microcomputer 216. An address decoder 258 (which includes a type 20L10 PAL integrated circuit, a buffer and plurality of NOR gates) decodes the addresses provided at the microcomputer address bus 260 and selects devices for read or write operations. The programming for the PAL devices of FIG. 7 is provided in Appendix B of copending application "Configurable Disk Memory Servowriter".

Included within the devices addressable by the microcomputer 216, is a 4-channel digital to analog converter circuit 262 (type AD7226 integrated circuit, manufactured by Analog Devices, Inc.). The digital to analog converters 262 allow the microcomputer 216 to configure certain analog voltage levels within the controller board 224 for operations described below. In addition, two 3-channel 16-bit counter-timer circuits 264 and 266 (type 82C54 integrated circuits manufactured by Intel Corporation) are written to by the microcomputer 216 to set various operation mode and count moduli. When read, the counter-timer circuits 264 and 266 also return count and status information to the microcomputer. The counter-timer circuits 264 and 266 are also used by the gate array 250 for various purposes described below.

To write servo pattern data onto the disk drive or read servo pattern data from the disk drive, the servowriter controller board 224 has a read-write amplifier 270 which has an input coupled to the gate array 250 and an output coupled to the servo read-write head 208 of the servowriter chassis base 202. Similarly, an amplifier 272 couples the gate array 250 to the clock read-write head 112. The amplifiers 270 and 272 are discussed in greater detail in connection with FIG. 18 below. A write current generator 274 provides controlled current to whichever head is selected by the gate array 250 for a write operation.

The gate array 250 is also coupled to external components 280 for the phase-locked loop 114 which is described in greater detail in connection with FIG. 17 below. The gate array 250 can latch sensor information from the servowriter chassis base 202 (FIG. 6) at a sensor port 282 which includes two 74LS244 latch integrated circuit chips. A fixed delay line 284, a delay line latch 286, and a programmable delay line 288 are used to verify the patterns written as described in greater detail in connection with FIG. 14 hereinbelow.

FIG. 8 illustrates the major functional logic sections of the gate array 250 which has been configured to write the required clock and servo patterns for a type 6650 disk drive, manufactured by Priam Corporation. The gate array 250 includes a processor status and command port interface 300 which latches commands from the microcomputer 216 and returns status information over the microcomputer bus. An operation decoder circuit 302 decodes the commands from the microcomputer and activates control lines to the other functional sections of the gate array 250.

The format of the command words from the microcomputer is depicted in FIG. 9. In the illustrated embodiment, there are four possible classes of operations as defined by bits 5 and 6 of the command byte. The two operation classes of primary interest here are index operations and clock track operations. The remaining two operation classes (i.e., mechanical operations and servo operations) are described in the copending application entitled "Configurable Disk Memory Servowriter".

In response to a gate array command to read or write a clock track, an operation sequencer 304 of the gate array 250 controls the cycle of the read or write operation. A frequency and time base generator 306 receives an 18 megahertz clock signal as a reference from a crystal oscillator 308 and also receives a variable frequency clock signal from a voltage controlled oscillator external to the gate array 250. The frequency and time base generator uses these signals to generate a variety of lower frequency clock signals for use by other sections of the gate array. The generator 306 further includes the phase-locked loop phase detector 118 (FIG. 5).

The servo signal to be written onto the servo surface of the disk drive 204 is generated by a servo signal generator and verifier circuit 310. A mechanical status and control block 312 controls the motors and actuators of the servowriter chassis base 202 in response to gate array commands from the microcomputer. The mechanical status and control block 312 and servo generator and verifier circuit 310 are described in greater detail in the co-pending application entitled "Configurable Servo Pattern Writer".

The gate array 250 also includes a clock pattern generator 102 which generates the clock patterns to be written to the disk drive. A clock pattern verifier 128 may be used to verify each clock track after it is written and thereby check for errors.

FIG. 10 shows the frequency and time base generator and phase detector logic circuitry 306 of the gate array 250 of FIG. 8 in greater detail. The logic circuitry 306 includes a divide by 12 circuit 400 which divides the 18 megahertz clock signal output by the oscillator 308 external to the gate array integrated circuit. The output of the divide by 12 circuit 400, a 1.5 megahertz clock signal, is selected by the multiplexer 130 as an input to the phase detector 118 of the phase-locked loop 114.

In the first stage of the clock closure process, the 1.5 megahertz clock signal is used as an input by the phase-locked loop 114 to generate the first preliminary clock pattern having a track pulse count approximating the final desired track pulse count. The operation of the multiplexer 130 is controlled by the operation sequencer 305 of the gate array 250. The phase detector 118 also implemented by the gate array 250 compares the input from the multiplexer 130 to the output of the divide by 12 circuit 124 which, in the illustrated embodiment, is implemented in the gate array 250 by a first divide by 2 circuit 404 and a divide by 6 circuit 406. The phase detector 118 compares the 1.5 megahertz signal from the multiplexer 130 to the 1.5 megahertz output of the divide by 6 circuit 406 and generates an up signal X or a down signal Y depending upon the phase difference of the two input signals. The up, down signals, X and Y, are provided to the phase-locked loop components 408 which are external to the gate array 250 and include the amplifier and low pass filter 120 of FIG. 5. The X and Y signals allow that the phase-locked loop 114 to lock onto the 1.5 megahertz clock signal from the multiplexer 130 and to generate an 18 megahertz system clock signal at the output of the voltage controlled oscillator 122. The operation of the phase detector 118 of the phase-locked loop 114 is described in greater detail in connection with FIG. 17 below.

The 18 megahertz clock signal output of the phase-locked loop 114 is provided to the clock pattern generator 102 which is shown in greater detail in FIG. 11. The clock pattern generator 102 includes a clock frequency doubler circuit 420 comprising a D-type flip-flop 422 which is clocked by the output of an exclusive OR gate 424 having one input coupled to the 18 megahertz output of the phase-locked loop 114 and the other input coupled to the $\overline{Q}$ output of the flip-flop 422. The D input of the flip-flop 422 is also coupled to the $\overline{Q}$ output to generate a 36 megahertz signal at the output of the exclusive OR gate 424.

A count corrector circuit 426 during the first stage of the clock writing process inputs the 36 megahertz clock signal and outputs a 12 megahertz clock signal at 428 without changing the phase of any individual pulses. The 12 megahertz signal is further divided by a divide by 8 circuit 430, generating a 1.5 megahertz clock data pattern which is written by the clock head 112 via the multiplexer 104 as the first preliminary or temporary clock pattern.

During the second stage of the clock writing process, the multiplexer 130 of FIG. 10 switches the input of the phase-locked loop 114 to the output of the clock head read amplifier 126 (FIG. 5) so that the phase-locked loop 114 locks onto the first preliminary clock pattern rather than the 1.5 megahertz clock signal from the divided output of the oscillator 308. In addition, the verifier circuit 128 determines the track pulse count of the first preliminary pattern, which is read by the microcomputer. Absent correction by the count corrector 426 of the clock pattern generator 102, the track pulse count of the second preliminary clock pattern written to the intermediate head 110 would be identical to the first preliminary clock pattern. In order to correct the track pulse count of the first preliminary clock pattern so that the track pulse count of the second preliminary clock pattern has the desired final track pulse count, the microcomputer programs a counter channel 432 of a correction signal generator 434 which generates the appropriate periodic correction signals to the count corrector 426 to achieve the desired track pulse count. The counter channel 432 is clocked by the 9 megahertz clock output of the divide by 2 circuit 404 of the phase-locked loop 114. The counter 432 delivers pulses to an edge detector 436 which outputs correction pulses of 27 nanosecond duration to the count corrector circuit 426. The count correction input COR of the count corrector state machine 426 when pulsed, causes a phase shift in the Q2 output of the count corrector 42 in which each phase shift is equal to one period of the 36 megahertz clock (27 nanoseconds). The Q2 output advances in phase if the direction input bit DBO of the gate array 250 command word is true (logic 1), or retards in phase if the direction input is false (DBO equal to 0).

When correction pulses are applied to the count corrector 426, the Q2 output of the count corrector 426 is a signal having a frequency in the range of 12 megahertz plus or minus 3%. The variance in the frequency is a function of the number of correction pulses supplied by the correction pulse generator 434 and the direction of the correction as defined by the command word data bit DB0. The Q2 output signal is in turn divided by the divider circuit 430 to produce the clock data pattern having a frequency of 1.5 megahertz plus or minus 3%. Thus, in the illustrated embodiment, the first preliminary clock data pattern should have a track pulse count within 2% of the final desired pulse track count so that count closure can be achieved by the count corrector 426 on the first try.

The operation of the clock pattern generator 102 is illustrated in FIG. 12. Each cycle of the 36 megahertz clock signal from the clock frequency doubler 420 is designated time interval 0, 1, 2, etc. During time intervals 0–4 of the 36 megahertz clock signal, the correction pulse generator 434 has not applied any correction pulses. Accordingly, the correction pulse output of the counter channel 432 remains at a logic low state as does the edge trigger output of the edge detector 436. Consequently, the Q2 output of the count corrector circuit 426 is not shifted in phase and is at a frequency of 12 megahertz, one-third the frequency of the 36 megahertz clock signal. However, during time intervals T5–T9 the counter channel 432 outputs a correction pulse causing the edge detector circuit 436 to output a short pulse starting at time interval T6. During time interval T6, the direction control bit DB0 is at a logic zero state, indicating that the count corrector 426 will *retard* the phase of the output signal in response to a correction pulse. Consequently, the transition of the Q2 output of the corrector circuit 426 is shifted from time interval T8 to time interval T9, one cycle of the 36 megahertz clock signal. All remaining clock pulses of the Q2 output will be similarly delayed one cycle until the next correction pulse is applied.

During time intervals T12–T16, the counter channel 432 applies the next correction pulse which activates the edge detector 436. However, during this correction pulse, the direction control bit DB0 has changed to logic state 1. Consequently, the subsequent Q2 clock pulse counts will be *advanced* one 36 megahertz clock cycle. Thus, the transition of the Q2 clock pulse which would have occurred during time interval T15 has been advanced to time interval T14. Accordingly, it is seen that by applying an appropriate number of spaced correction pulses to the count corrector circuit 426, the clock data pattern written to the servo surface as the second preliminary clock pattern may have exactly the desired track pulse count.

The count corrector circuit 426 is a 2 bit, 2 input synchronous state machine. The states of the count corrector circuit are depicted in FIG. 13. The count corrector circuit has four states S0-S3 defined by the bits Q2 and Q1 where the Q2 bit provides the output of the count corrector 426 as shown FIG. 11. The count corrector state machine has two inputs, COR and DB0. The first input COR defines whether or not a correction is to take place in the present state. The second input, DB0, defines whether a correction will delay the phase (DB0=0) or advance the phase (DB0=1). Whenever the correction input COR is false or logic zero, the state machine operates as a modulo 3 counter, cycling continuously through states S0, S1 and S2. At each occurrance of state S2, the Q2 bit is a logic 1, providing a pulse output of the count corrector circuit. If the correction input COR is true (COR=1) and the direction input DB0 is false (DB0=0), the next state of the state machine will remain the present state, causing a phase delay in the output. Thus, for example, at state S0 (Q2,Q1=00), if the correction input COR is true and the correction bit DB0 is false, the state machine returns to state S0, causing a delay in the output of the count corrector circuit. On the other hand, whenever the correction input COR is true and the correction input DB0 is true, the next state of the state machine will advance two states modulo 3, instead of 1, thus advancing the signal phase. For example, if the present state is state S0, the state machine will advance to state S2, not state S1, if the inputs (COR, DB0) are equal to 11. If the inputs (COR, DB0) are equal to 11 when the present state is S1, the state machine advances to a fourth state S3 (Q2, Q1=11), instead of state S0. State S3 sets bit Q2 high, which yields an output pulse substituting for the state S2 which would otherwise be skipped. The states of state S3 are otherwise identical to those of state S0. A variety of functionally similar state machines may also be used.

As previously mentioned, the verifier circuit 128 determines the track pulse count of the first preliminary clock pattern during the second stage of the clock closure process. FIG. 14 shows the verifier circuit 128 to include a counter channel 440 which determines the track count by counting 1.5 megahertz clock pulses from the first preliminary clock pattern during one exact revolution of the disk. Once obtained, the track count is read by the microcomputer which then reloads the counter 440 to provide the index to the operation sequencer 304 for the next write operation. Verification of the track pulse counts of the second and third clock tracks is performed in a similar manner.

The verifier circuit 128 also verifies phase closure. The phase closure verification process is described in greater detail in copending application entitled "Configurable Disk Memory Servowriter". Briefly, the signal read from the clock (or intermediate) head is delayed by a fixed 200 nanosecond delay line 442 and the 1.5 megahertz phase-locked loop clock signal is delayed by a programmable 15–270 nanosecond delay line 444. The delayed read signal is compared to a reference by a comparator 446, the output of which is coupled to the D input of a flip-flop 448. The delayed 1.5 MHZ clock signal is used to clock the flip-flop 448. Synchronization is performed by a flip-flop 450 coupled to the output of the flip-flop 448. A 54 nanosecond positive error pulse results from each clock pulse which does not compare properly. Error pulses are logged by a counter channel 452.

Phase closure for the entire track may be measured by performing a series of verify operation passes, with the microcomputer loading various delay values to the programmable delay line 444 in order to determine the width of the "phase window" over which no compare errors are found. The measured window is compared to predetermined values for the disk system on which the clock is being written. A narrower than expected window indicates possibly inadequate phase closure or media defects resulting in the rejection of the clock track.

Clock pattern write and verification operations are initiated by the operation sequencer 304 (FIG. 8) in response to gate array command words from the microcomputer. FIG. 15 illustrates a typical write operation. Write current and write gating signals (clock write select or servo write select, FIG. 7) are enabled immediately after receipt of a write command. After a 12 microsecond stabilization delay during which the track is DC erased to the same polarity as the polarity used by the DC erase operation, the selected data pattern is gated onto the write drivers. 12 microseconds after the next output of the index counter 440 (FIG.14), the operation is terminated and the write devices and pattern generators are disabled.

If a clock pattern was written by the operation just completed, the multiplexer 130 (FIG. 10) is caused to switch inputs to the phase-locked loop 114 so that the source signal is the pattern just written. To verify the pattern, the verification process is similar to that of the write process with a few differences. First, index is derived from a pulse index which was previously written to the head opposite the one being verified. The index counter 440 is then used to record the track pulse count, as previously described. Second, the 12 microsecond delay is not employed. Instead, the verify operation occurs during exactly one revolution of the disk. Third, the phase-locked loop source is not switched at the end of the verify process.

FIG. 16A is a simplified schematic diagram of the count correction system of FIGS. 10 and 11. The system of FIG. 16A may be characterized as a "simple" count correction system. It is recognized that many other count correction designs may be utilized as well. For example, FIG. 16B shows a "compound" system which uses a second count corrector subsystem 460 to modulate the clock input to a counter channel 462 of the main corrector subsystem 464. A counter channel 466 of the secondary corrector subsystem 460 is clocked by the divided output of a 27 MHZ oscillator 468. The counter 466 provides correction pulses to a count corrector circuit 470 of the corrector subsystem 460. The corrector 470 is clocked by the 27 MHZ clock signal and modulates the clock signal to the counter channel 462. The programmable counter channel 462 in turn provides correction pulses to a count corrector circuit 472 of the main corrector subsystem 464 to generate an 18 MHZ signal (plus or minus 3%, depending upon the frequency of the correction pulses and direction of the correction). Such an arrangement allows a greater range and precision of correction than the simple corrector system.

Other variations are also possible. For example, the count corrector subsystem may be included within the voltage controlled oscillator frequency division stages of the frequency and time base generator (FIG. 10). In such an arrangement, count corrector phase transients are suppressed by the phase-locked loop before ever being written to the disk, rather than in a subsequent write operation.

Figures 17, 18:
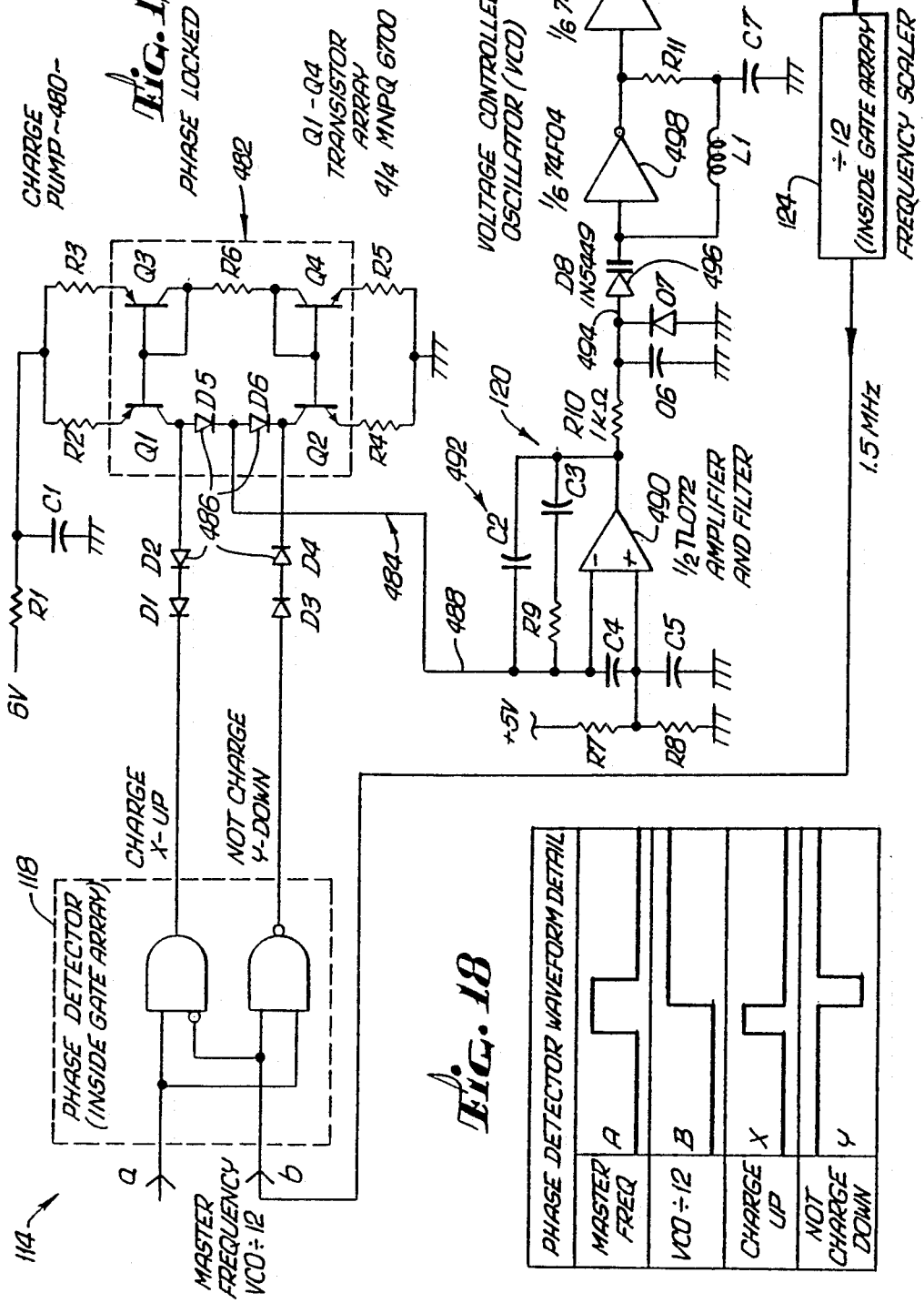
FIG. 17 is a schematic diagram of the phase-locked loop of FIG. 10.
FIG. 18 depicts various waveforms of the phase detector of FIG. 17.

The phase locked-loop 114 of FIG. 10 is described in greater detail in FIG. 17. The phase detector 118 of the phase locked-loop 14 has a master frequency input A coupled to the output of the multiplexer 130 (FIG. 10), and a slave input B coupled to the output of the divide by 12 divider circuit 124. The "charge up" X and the "not charge down" Y outputs cause a charge pump 480 to inject or withdraw current at the amplifier and filter circuit 120, the output of which varies the frequency of the voltage controlled oscillator 120 so as to maintain phase lock between the master and slave frequency input signals. The phase detector 118 is of a standard design, described by the logic equations X=A*B' and Y=(A*B)'. The positive portion of the A input to the phase detector 118 enables either a positive or a negative charge pump output, depending upon the state of the B input. The positive charge pump output is enabled when the B input is false, and the (active low) negative charge pump output is enabled when the input B is true. The average charge pump output is zero when the true (positive) portion of the master frequency pulse at input A is centered about the rising edge of the slave frequency pulse at input B. FIG. 18 shows the positive transition 482 of the slave frequency input B somewhat past the center of the master frequency input A. Consequently, the "charge up" output X is of somewhat longer duration that the "not charge down" output Y (active low).

The charge pump circuit 480 comprises transistors Q1–Q4 (type MMPQ6700 transistor array integrated circuit) which are arranged in a pair of current mirrors 482 and 484 providing positive and negative current sources. The currents of the positive and negative current sources are shunted between the X and Y outputs of the phase detector 118 and the input of the amplifier and filter circuit 120 by the action of gating diodes 486. The charge pump circuit output 488 is provided directly into the inverting input of the amplifier and filter circuit 120 of the phase-locked loop 122.

The amplifier and filter circuit 120 comprises one operational amplifier (of a type TL072 integrated circuit) 490 in an inverting configuration with feedback in the form of a lag-lead filter 492. Those skilled in the art will recognize this circuit as an enhancement of a simple integrator.

The DC output 494 of the amplifier and filter circuit 120 is coupled to the tuning element 496 of the voltage controlled oscillator 122 which is a Colpitts type oscillator formed from one inverter 498 (of a type 74F04 integrated circuit), with another inverter 500 being used as an output buffer. In the illustrated embodiment, the variable tuning element 496 is a varactor diode. The output 502 of the voltage controlled oscillator 122 is divided in frequency by 12 by the divider circuit 124, the output of which is coupled to the slave input B of the phase detector 118, completing the phase-locked loop. Consequently, the output of the oscillator 122 is phase locked at 12 times the frequency of the signal at the master input A to the phase detector 118. Should the phase-locked loop 114 not reliably capture, it is recognized that a number of known modifications for assisting capture may be used.

Figure 19:
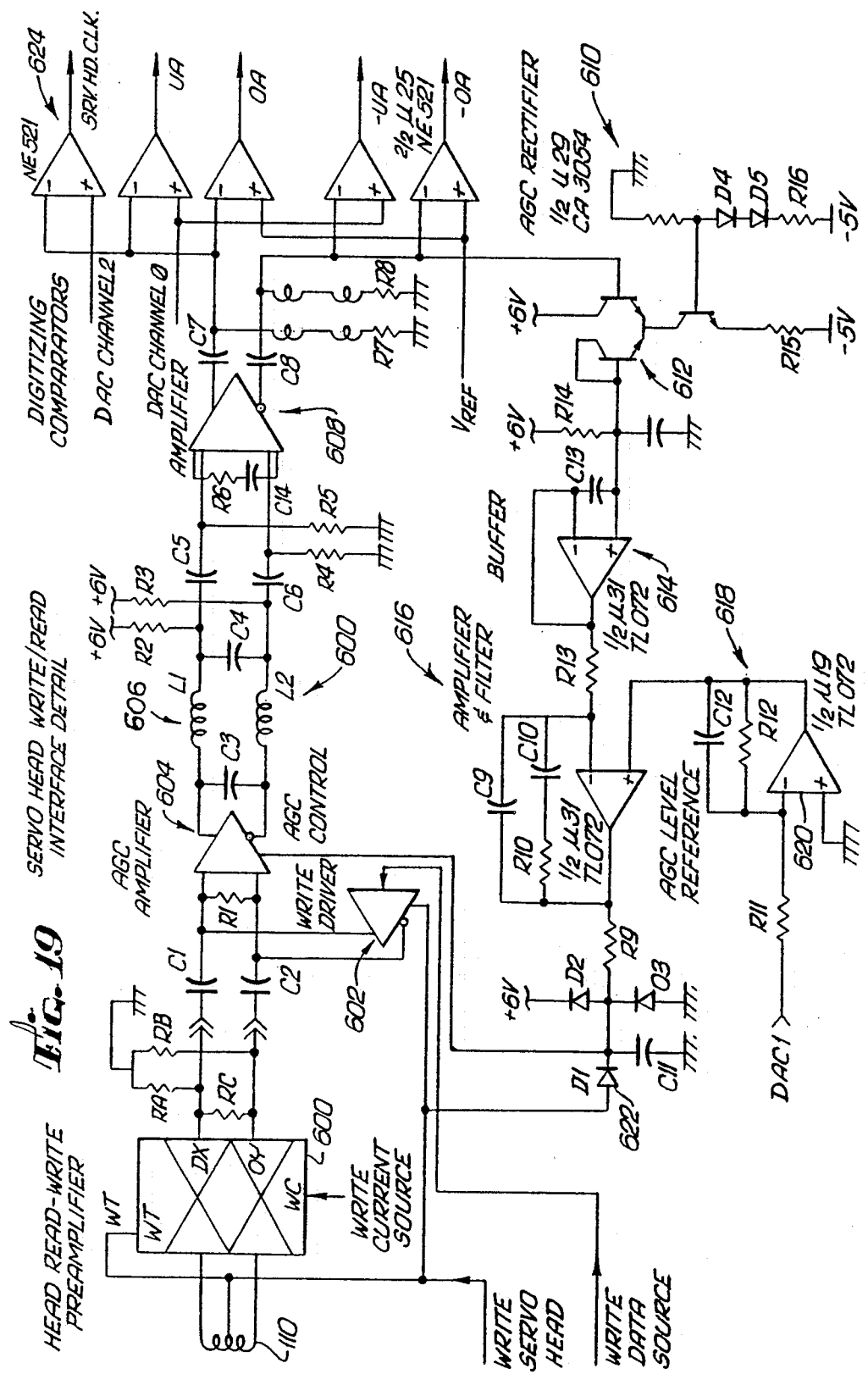
FIG. 19 is a schematic diagram of the servo head read-write interface of the system diagram of FIG. 7.

FIG. 19 shows the interface between the servo read-write head 110 and the gate array 250. The interface includes a read-write preamplifier 600 which, in the illustrated embodiment, is a type 32R104 integrated circuit which includes a current mode driver and miscellaneous control gating. The preamplifier 600 is mounted on the carriage arm 206 (FIG. 6) near the head 110. A write signal driver 602 (one section of a type 75110 integrated circuit) drives write data from the controller 224 to the read-write amplifier 600 when enabled by the write servo head signal. When in the read mode, the amplifier 600 amplifies the read signal from the head 110. The magnitude of the read signal is controlled by an automatic gain control (AGC) amplifier 604 which includes a type MC1350 integrated circuit. The amplified read signal is also filtered to remove noise by a low pass filter 606 and is further amplified by an amplifier 608.

As previously mentioned, the output signal amplitude of the read amplifier is controlled by an automatic gain control amplifier 604. An automatic gain control rectifier 610 detects the output amplitude and comprises a differential amplifier 612 (one section of a type CA3054 integrated circuit) connected so as to form a precision, low off-set rectifier. A buffer 614 (one section of type TL072 integrated circuit) provides a high impedance load for the AGC rectifier 610. An amplifier and filter circuit 616 compares the output of the buffer 616 with the output of an automatic gain control level reference 618. The reference 618 includes an operational amplifier 620 (one section of a type TL072 integrated circuit) which has an input connected to a digital to analog convertor channel. The output of the amplifier and filter circuit 616 provides a filtered error signal which drives the automatic gain control input of the automatic gain control amplifier 604 in such a fashion as to maintain a constant signal output from the amplifier 608. The servo head write enable signal is also connected to the AGC control pin of the AGC amplifier 604 through a diode 622 so as to disable the read amplifier during a write operation. In the illustrated embodiment, a typical read output will be approximately 2 volts peak to peak.

A set of digitizing comparators 624 (type NE521 integrated circuits) provide an interface between the read amplifier and the gate array 250. The comparators 624 compare the instantaneous read signal level with various level thresholds established by digital to analog converter channels and also with a fixed threshold Vref. A false logic output is developed by each comparator during the time that the read signal amplitude exceeds the comparison threshold associated with that comparator. Since the comparators 624 are connected to both the non-inverting and inverting outputs of the amplifier 608, both positive and negative read signal peaks may be tested. In general, the comparator output designated "servo head clock" provides read back signal from the servo head for the clock closure process. The other comparators are generally used only during the servo pattern writing process.

The controllable automatic gain control level reference circuit 618 has a special purpose during the reading of an index pulse track from the servo head 110. When reading a track containing an index pulse, no signal input will be present at the input of the automatic gain control rectifier 610 throughout most of the track. To prevent the automatic gain control system from excessively increasing the gain of the system under these conditions, the automatic gain control level reference may be reduced to only a few tenths of a milivolt, so that system white noise will cause the AGC rectifier 610 to hold the system gain at a reasonable level. The index pulse may be allowed to saturate the amplifier 608 without adverse effect.

The interface for the clock head read-write amplifier is the same as that for the servo head read-write amplifier interface shown in FIG. 19 with two exceptions. First, the controllable AGC level reference circuit 618 is replaced with a fixed reference, since an index track need not be employed on the clock head. Secondly, only one comparator need be connected to the clock amplifier chain. This comparator is used to provide the clock head digitized read back signal for the clock closure and verify operations as well as the user applications. The comparison level is set by a digital to analog converter channel.

Figure 20:
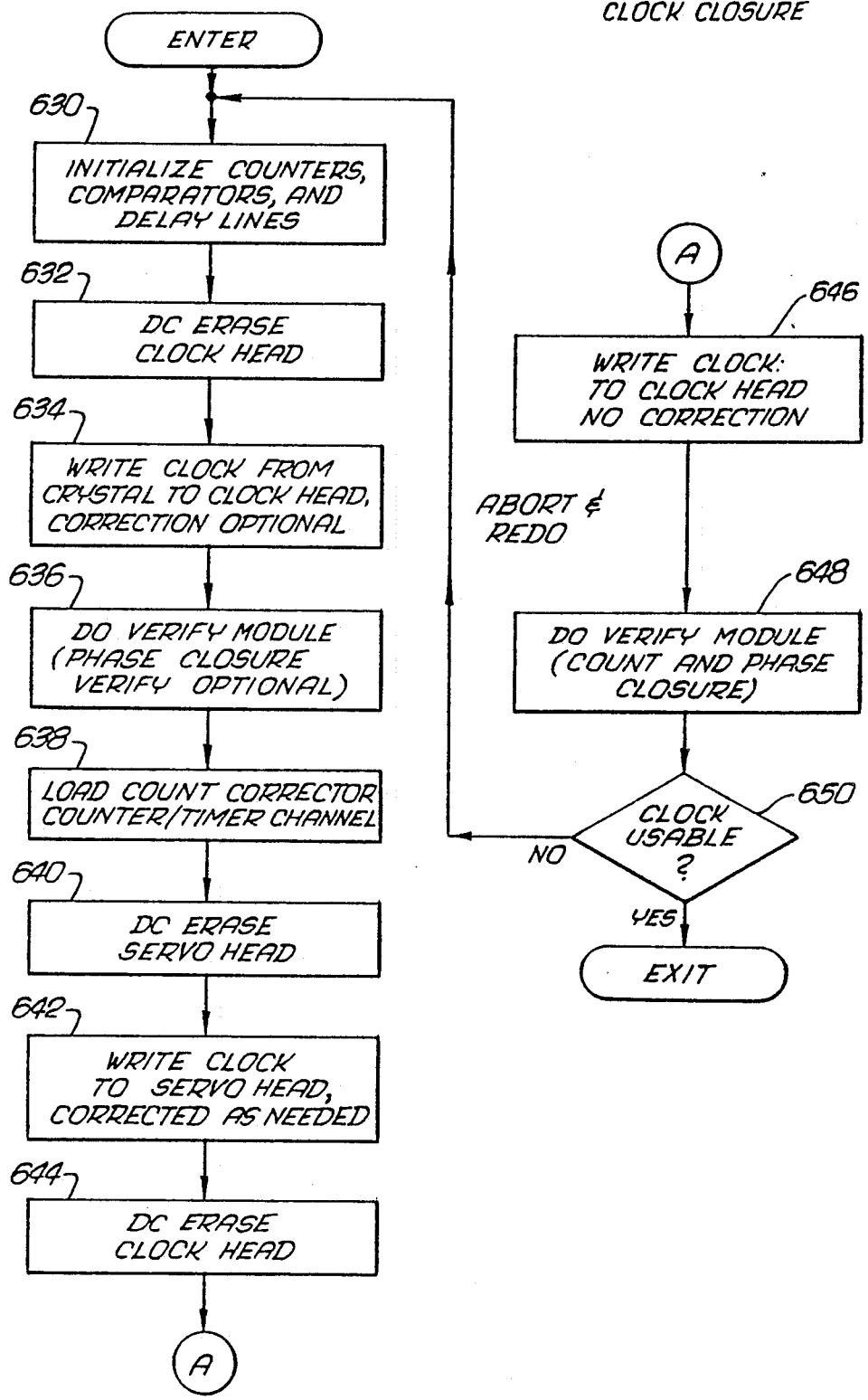

The overall operation of the clock closure process of the illustrated embodiment is set forth in FIG. 20. After all configurable system elements are initialized (block 630), the clock track is erased (block 632). The first preliminary clock track is then written (block 634) using the crystal oscillator as the source to the phase-locked loop to generate the first preliminary clock pattern. (At this stage, count correction may optionally be employed during the write operation. This option is desirable if experience with a particular model of disk drive has revealed that the spindle motor speed control system operates at a predictable speed offset from its nominal design speed.)

Once the preliminary clock track has been written, a verify operation is performed (block 636) to determine the track pulse count. It should be noted that the write splice phase transient of the first preliminary clock track is not controlled in the illustrated embodiment. It is expected that this phase transient will normally be distributed over a large number of pulses during the following two clock write operations such that the phase shift (if any) in any given clock cycle will be extremely small. However, in very demanding systems it is anticipated that a small residual phase transient might affect system performance. For example, bit shift might occur in a high data rate run-length-limited data separator where the clock track supplies the write clock. For these demanding systems, phase closure of the first preliminary clock track may be measured, and the clock track would be rejected and rewritten if the measured phase closure exceeded a predetermined limit. However, as the allowable write-splice phase closure tolerance will typically be much looser than that of the final clock track, and since the track pulse count need not be controlled, the number of retries likely to be needed for the preliminary clock track is likely to be quite small.

Once the first preliminary clock track pulse count has been measured, the microcomputer compares the measured track pulse count to the desired track pulse count and computes the number and direction of correction pulses needed to achieve the desired track pulse count. The counter channel 432 of the clock pattern generator 102 is then loaded (block 638) with the appropriate number to cause the generation of the desired number of periodic correction pulses to the count corrector circuit 426. The servo head 110 is then erased (block 640) and the second preliminary clock track is written (block 642) to the servo head, correcting the frequency of the second preliminary clock pattern as needed. No verify operation is needed for the second preliminary clock track.

The first preliminary clock track is subsequently erased (block 644) and the final clock track is written (block 646) to the clock head. For the final clock track, no correction of the pulse track count should be needed. After it is written, the final clock track is verified (block 648) and if the track pulse count is correct and any phase transients are within allowable limits (decision block 650), the clock generation operation is complete. On the other hand, if media defects are detected, the clock is discarded and the operation is repeated. However, using the clock closure process of the present invention as described above, it is anticipated that closure will normally be achieved on the first try.

Figure 21:
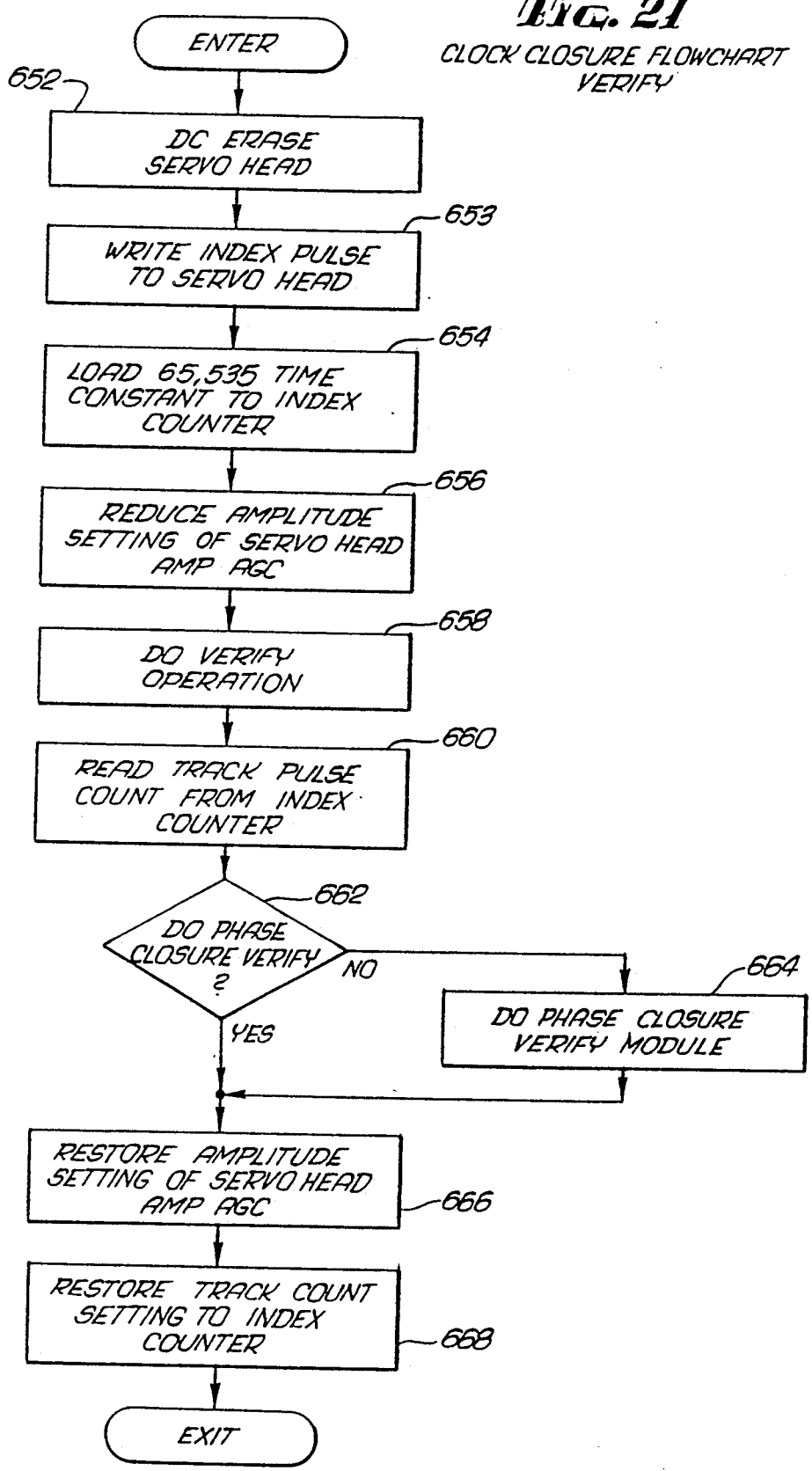

FIG. 21 describes the overall closure verification operation. In the illustrated embodiment, this operation is performed on a clock track written to the clock head. First, the servo head is erased (block 652) and an index pulse is written (block 653) to the servo head. The index counter 440 is then loaded (block 654) with a maximum time constant (65,535). A reduced amplitude reference is supplied (block 656) to the servo head automatic gain control level reference circuit 616 for use in reading the index pulse. The track pulse count verification operation is then performed (block 658) and the microcomputer reads (block 660) the track pulse count from the index counter 440. If phase closure measurements are desired (decision block 662), the phase closure sequence is performed (block 664). Finally, the servo head automatic gain control reference level is reset (block 666) and the index counter 440 is reset (block 668) as well.

The phase closure operation is described in the flowchart of FIG. 22. First, the programmble delay line 444 is set (block 670) to a delay value such that the verify strobe (1.5 megahertz clock transition) will occur just before the leading edge of the window expected for a clock track with perfect phase closure. A phase closure verify operation is then performed (block 672) and the error count logged by the counter 452 is read (block 674) by the microcomputer. If any errors are detected (decision block 676), the delay line is reprogrammed (block 678) for the next larger available delay, and the verify operation is repeated (blocks 670-676). When errors are no longer detected, the leading edge of the window has been determined. In an analogous fashion, the trailing edge of the window then determined (blocks 680-688). The width of the window is then calculated and compared (block 690) with the predetermined window for a clock track with perfect phase closure and no media defects. The time interval by which the measured window is narrower than the expected window is a measure of the combined effect of media defects, noise and phase transients upon the clock track. In general, the worst expected phase transient will likely be smaller than the reduction in width of the window. The user may select an acceptable quality for the clock based upon the intended application.

Thus, it is seen from the above, the present invention provides a disk drive clock writer which readily achieves count and phase closure, while requiring no more than a single phase-locked loop. It will, of course, be understood that modifications of the present invention, in its various aspects, will be apparent to those skilled in the art, some being apparent only after study and others being merely matters of routine electronic design. For example, a three head implementation is also possible. In the closure process and apparatus of the present invention, a pulse index written on one side of the heads may be used for count closure verification but is not needed for the writing of any clock track. However, if the pulse index is not used during the write operation, it may be necessary to write the initial temporary clock during more than one exact revolution of the disk to ensure complete coverage of the entire track. However, the final clock track may, if desired, be written during one exact revolution of the disk. In addition, verify operations may be performed at write time, rather than using a subsequent read operation.

In another alternative embodiment, the phase closure of the first preliminary clock pattern may be measured and compared to a predetermined allowable limit. If the phase transient of the first preliminary clock pattern exceeds the allowable limit, it may be discarded and a new preliminary clock pattern written.

Other embodiments are also possible, with their specific designs being dependent upon the particular applications. As such, the scope of the invention should not be limited by the particular embodiments herein described, but should be defined only by the appended claims and equivalents thereof.

I claim:

1. A disk drive clock writer for writing a clock pattern having a predetermined number of clock pulses around a clock track of a magnetic memory disk, comprising:
    means for writing a preliminary clock pattern on the disk, said preliminary clock pattern having a number of clock pulses approximately equal to the predetermined number of clock pulses; and
    means for reading the preliminary clock pattern to verify the actual number of clock pulses; and
    means responsive to the reading means for writing a second clock pattern on the disk, which includes means for generating a source signal in phase with the preliminary clock pattern and correction means for advancing or retarding the phase of selected individual pulses of the source signal so that the second clock pattern has said predetermined number of clock pulses.

2. The disk drive clock writer of claim 1 further comprising:
    means for reading the second clock pattern; and
    means responsive to the second clock pattern reading means for writing a third clock pattern including means for reducing phase transients of the second clock pattern wherein the third clock pattern has said predetermined number of clock pulses.

3. A method for writing a clock pattern having a predetermined number of clock pulses around a clock track of a magnetic memory disk, comprising the steps of:
    writing a preliminary clock pattern on the disk, said preliminary clock pattern having a number of clock pulses approximately equal to the predetermined number of clock pulses;
    writing a second clock pattern on the disk by generating a source signal in phase with the preliminary clock pattern and advancing or retarding the phase of selected individual pulses of the source signal so that the second clock pattern has said predetermined number of clock pulses.

4. The method of claim 3 further comprising:
    reading the second clock pattern; and
    writing a third clock pattern by for reducing phase transients of the second clock pattern wherein the third clock pattern has said predetermined number of clock pulses.

5. A disk drive clock writer for writing a clock pattern having a predetermined number of clock pulses around a clock track of a magnetic memory disk, comprising:
    a signal source;
    means for generating a predetermined number of spaced correction pulses; and
    means responsive to the correction pulse means for writing a clock pattern on the disk, which includes means for advancing or retarding the phase of individual pulses of the source signal in response to correction pulses so that the clock pattern has said predetermined number of clock pulses.

6. The disk drive clock writer of claim 5 wherein the correction pulse generating means comprises a counter and the writing means comprises a divider circuit.

7. A disk drive clock writer for writing a clock pattern having a predetermined number of clock pulses around a clock track of a magnetic memory disk, comprising:
    a signal source;

means for generating a predetermined number of spaced correction pulses; and means responsive to the correction pulse means for writing a clock pattern on the disk, which includes means for advancing or retarding the phase of individual pulses of the source signal in response to correction pulses so that the clock pattern has said predetermined number of clock pulses;

wherein the correction pulse generating means comprises a counter and the writing means comprises a divider circuit; and wherein the divider circuit comprises a modulo counter state machine having a plurality of states in which the phase of the output of the divider circuit is advanced by skipping a state in response to an advance correction pulse and is retarded by repeating a state in response to a retard correction pulse.

8. The disk drive clock writer of claim 6 wherein the correction pulse generating means comprises a signal source, a second counter for counting the pulses of the signal source, and a second divider circuit coupled to the output of the second counter for dividing the frequency of the signal source, said second divider having means for advancing or retarding the phase of the second divider circuit output in response to the output of the second counter, the first counter being coupled to the output of the second divider circuit and the first divider circuit being coupled to the output of the first counter for dividing the frequency of the source signal, said first divider having means for advancing or retarding the phase of the first divider output in response to the output of the first counter.

9. A disk drive clock writer for writing a clock pattern having a predetermined number of clock pulses around a clock track of a magnetic memory disk, comprising:

a signal source;

means for generating a predetermined number of spaced correction pulses; and a phase-locked loop which includes a voltage controlled oscillator, a divider having an input coupled to the output of the oscillator, and a phase detector having a first input coupled to the signal source and a second input coupled to the output of the divider, said divider including means for advancing or retarding the phase of individual pulses of the divider output in response to correction pulses so that the divider output has said predetermined number of clock pulses when written around a clock track.

10. A disk drive clock writer for writing a clock pattern having a predetermined number of clock pulses around a clock track of a magnetic memory disk, comprising:

an oscillator having a predetermined frequency;

a phase lock loop circuit having an input coupled to the output of the oscillator for writing a preliminary clock pattern on the disk, said preliminary clock pattern having a number of clock pulses approximately equal to the predetermined number of clock pulses;

means for reading the preliminary clock pattern to verify the actual number of clock pulses; and means responsive to the reading means for generating a predetermined number of phase advance or phase retard correction pulses as a function of the difference between the actual number of clock pulses in the preliminary clock pattern and the predetermined number of clock pulses;

said phase lock loop circuit having an input coupled to the reading means to generate a source signal in phase with the preliminary clock pattern;

wherein the clock writer further has correction means coupled to the output of the phase lock loop and responsive to the correction pulses for advancing or retarding the phase of selected individual pulses of the source signal so that the second cock pattern has said predetermined number of clock pulses, said correction means including a divider circuit comprising a modulo counter state machine having a plurality of states in which the phase of the output of the divider circuit is advanced by skipping a state in response to an advance correction pulse and is retarded by repeating a state in response to a retard correction pulse.

* * * * *